(12) United States Patent
Kuba

(10) Patent No.: US 6,364,334 B1
(45) Date of Patent: Apr. 2, 2002

(54) BICYCLE FRAME

(75) Inventor: Vladislav Kuba, Grosskarolinenfeld (DE)

(73) Assignee: Georg Fritzmeier GmbH & Co., Grosshelfendorf (DE)

(*) Notice: Subject to any disclaimer, the term of this patent is extended or adjusted under 35 U.S.C. 154(b) by 0 days.

(21) Appl. No.: 09/486,845

(22) PCT Filed: Aug. 28, 1998

(86) PCT No.: PCT/DE98/02536

§ 371 Date: May 17, 2001

§ 102(e) Date: May 17, 2001

(87) PCT Pub. No.: WO99/11511

PCT Pub. Date: Mar. 11, 1999

(30) Foreign Application Priority Data

| Sep. 4, 1997 | (DE) | 197 38 778 |
| Sep. 5, 1997 | (DE) | 197 38 969 |
| Aug. 4, 1998 | (DE) | 198 35 242 |

(51) Int. Cl.[7] ............................................. B62K 15/00
(52) U.S. Cl. ........................................................ 280/287
(58) Field of Search ................................ 280/281.1, 287, 280/274, 278

(56) References Cited

FOREIGN PATENT DOCUMENTS

| BE | 690238 A | 5/1967 |
| DE | 29513779 U | 11/1995 |
| DE | 4423647 A | 1/1996 |
| FR | 1514213 A | 5/1968 |
| NL | 6401631 A | 8/1965 |

*Primary Examiner*—Kevin Hurley
(74) *Attorney, Agent, or Firm*—Oliff & Berridge, PLC

(57) ABSTRACT

What is described is a disassemblable bicycle frame, including connecting means (24) for releasably joining together two frame parts (26, 28), with this bicycle frame being characterized by an abutment with a supporting member (128) which extends from one frame part (26) through a plane containing the plane of separation (30) as far as a bearing (126) in the other frame part (28), and tensioning means (34) for bracing the two frame parts (26, 28), so that the supporting member (128) is supported against the bearing (126) and the two frame parts (26, 28) contact each other by their front faces.

16 Claims, 19 Drawing Sheets

BICYCLE FRAME

The invention relates to a bicycle frame in accordance with the preamble of claim 1, and coupling means in particular for the connection of a like bicycle frame.

In recent years, there has been an increasing tendency among automobile manufacturers to offer brand specific products in addition to the vehicles. One particular focal point rests on high-value bicycles offered by the traders under their respective brands, who thus enter into direct competition with bicycle traders. In terms of their construction, the bicycles are generally adapted to the one target group the respective automobile manufacturer desires to reach with his vehicles. Thus, sports car manufacturers as a rule offer very sporting racing bikes and mountain bikes, whereas other enterprises concentrate on touring or trekking bikes. The manufacturers additionally offer carrier systems constructively adapted to the automobile type and to the bicycle.

Most recently, leading automobile manufacturers sell so-called "roadsters", i.e., two-seater open-tops and convertibles possessing a comparatively limited trunk volume and conceived essentially with a view to maximum driving fun, and in a lesser degree to maximum transport capacity. The like roadsters are as a general rule designed as convertibles, or with removable or retractable roof elements, whence fastening of the roof rack systems poses problems. These vehicles have a very compact design so that roof transport of a large-size bicycle is not in agreement with aesthetic standards. There is therefore a desire to design the bicycles with disassemblable frames to enable easier roof rack transport.

German utility model No. 295 13 779 discloses a sports bicycle having a disassemblable carbon frame separable through the intermediary of a insertion connection, with fixation of the frame parts being effected by means of a quick-lock connection. In this insertion connection, an end portion of the one frame part is inserted into the correspondingly fashioned end portion of the other frame part, with the provided fit having to ensure joining together of the frame parts at low expenditure of force on the one hand, and precise guidance of the frame components relative to each other on the other hand.

In such insertion systems there is, however, a possibility of soiling adhering in the overlap region to cause difficulty in assembling or disassembling the frame parts. Such soiling may damage the insertion fit to detract from the lifetime of the frame. Another problem is that this insertion fit must be produced with maximum precision, requiring considerable expenditure in terms of device and production technology.

In these high-value bicycles the transfer elements for actuation of the gear-shift mechanism and the rear wheel brake are customarily routed in the frame to avoid degradation of the aesthetic impression of the frame by Bowden wire guides etc. Disassemblable bicycles present a problem in that these actuating means (Bowden wires) extend through the plane of separation of the frame parts and must therefore be provided with corresponding coupling means. The above mentioned publication proposes in this respect to couple the Bowden wires by means of a hydraulic system. As an alternative, a mechanically acting lever mechanism 15 disclosed, wherein the Bowden wires are linked to a respective pivoting lever in each frame part, and the rotating movements of the levers are used for transferring the actuation forces. Realisation of either construction variant requires considerable expense in terms of device technology which quite considerably influences the price of the frame.

One further problem resides in the fact that the sophisticated coupling systems are prone to soiling and did not present the necessary reliability in exacting, long-term operation.

From-FR-A-1514213 a disassemblable bicycle frame is known, wherein a down tube of the frame is separable into two frame parts along a plane of separation, and from which the present invention starts out. What is provided are connecting means for releasably joining together the two frame parts at the plane of separation, with the connecting means including an abutment with a supporting member which extends from; one frame part through a plane containing the plane of separation as far as a bearing in the other frame part and presents tensioning means for bracing the two frame parts, such that the supporting member is supported against the bearing, and the two frame parts contact each other by their front faces.

Herein the plane of separation essentially extends perpendicularly with respect to the longitudinal axis of the down tube. This circumstance, and the chosen design of the connecting means having the form of a simple tension bracket, have the effect that this known bicycle frame is only suited for low strains. Particularly for the use in so-called ATBs (all-terrain bikes) or mountain bikes it may be presumed to be utterly insufficient.

In contrast, the invention is based on the object of furnishing a disassemblable frame for a bicycle and a coupling system, in particular for such disassemblable frames, enabling a reliable connection of the structural components at minimum expense in terms of device technology.

This object is attained through the features of claim 1 as regards the frame, and through the features of claim 20 with respect to the coupling means.

Accordingly, in the bicycle frame in accordance with the invention the plane of separation extends through the down tube in such a manner as to have an inclination of approximately 45° relative to the center axis of the down tube, the supporting member is a hook fastened in a down tube portion, and the abutment is a bolt arranged in the other down tube portion, a section of which is encompassed by said hook, and the encompassing portion of the hook transfers a force component acting in the direction of the vertical axis of the bicycle to said bolt.

Hereby a high-strength connection is made possible: the separation into abutment/supporting member and tensioning means, as well as the support along the front face enable the transfer of extremely high frame forces, so that the bicycle frame satisfies even maximum demands, for example in the case of downhill contests.

The frame parts may be joined together in a particularly easy manner inasmuch as the supporting member has the form of a hook, and this hook-shaped portion is supported on a bolt. The direction of support is chosen such as to coincide with the direction of the forces introduced into the frame by the rider, whence the rider's very weight contributes to maintaining the connection between the supporting member and the abutment. The hook-shaped design of the supporting member moreover makes it possible to perform a relative rotation of the two frame parts when the tensioning means are released, with this rotating movement being guided by engagement of the hook-shaped portion of the supporting member on the bolt.

Inasmuch as slide fits are essentially not necessary, damage to the frame fit owing to soiling is virtually impossible. The construction of the connecting means according to the invention moreover allows for easy cleaning of the structural components prior to assembly, whereby failures due to jamming etc. are prevented. As the frictional connection is established through the intermediary of the tensioning means and the abutment/supporting member, and the tensioning force may be modified through corresponding readjustment of the tensioning means, tolerances due to manufacture or wear of the joint may be compensated by readjusting the tensioning force without the fit quality being affected in any way whatsoever.

Relative rotations of the two frame parts are facilitated if the front or bearing surface of one of the frame parts is recessed in the range of the abutment such that the frame parts may be pivoted about the abutment without any collision of the front surfaces.

The tensioning means preferably include a pivotally mounted tensioning hook, the hook portion of which may be taken into engagement with a tensioning bolt fastened on the other frame component. These tensioning means may, for example, have the form of an elbow lever. It is, however, preferred to mount the tensioning hook on an eccentric shaft which may be rotated with the aid of a tensioning lever. Owing to the eccentric mounting of the tensioning hook, a predetermined tensioning force holding the two frame parts together and pressing the supporting member onto the abutment may be applied upon closing the tensioning means.

A particularly smooth planar construction is obtained if the tensioning lever may be pivoted towards the tensioning hook for locking and in the process enters into a recess on the outer surface of the frame parts such that the tensioning lever is received flush in the frame.

The frame is preferably manufactured of high-strength plastic, for example of carbon fiber, with the contact portions of the frame component and the tensioning device itself being formed in housing parts of metal preferably embedded in the plastic frame. This combination of materials one the one hand allows for a very lightweight frame, while on the other hand wear to the frame in the separating line is reduced to minimum by the metal construction of the housing part.

The couplers for connecting the actuating means for the brake and for the gear-shift mechanism are preferably formed to comprise claws which may be taken into engagement, or disengaged, by a relative movement of the two frame parts upon assembling or disassembling the frame. Owing to this positive connection of the actuating means—preferably Bowden wires—no additional coupling means as in the above mentioned prior art (hydraulic components, pivoting levers) need to be provided, so that the structural space for the coupling means is minimum.

The claws in accordance with the invention, which include alternately formed engagement projections and reception grooves (toothing), preferably have a lateral orientation relative to the longitudinal axis of the actuating means (Bowden wire), so that the coupling/uncoupling movement takes place not in the longitudinal direction of the Bowden wires, but in transverse direction.

If the coupling means are to be used on the above described frame, the coupling members are joined together, or uncoupled, by a relative rotation of the frame parts.

In another embodiment deemed to be particularly advantageous, the tensioning means in the assembled condition of the two frame parts receive a force from a depressor indirectly or directly communicating with a seat post of the bicycle frame. Due to the fact that the tensioning means in the assembled condition of the two frame parts receive a force from a depressor indirectly or directly communicating with a seat post of the bicycle frame, first of all advantageously an additional safety of the connection between the two frame parts is effected by the weight of the person riding the bicycle, acting on the depressor via the seat post. Moreover the seat post may be employed as an opening lever upon separation of the two frame parts, as it were, so that opening the tensioning means for disengaging the two frame parts from each other may be effected through the greater leverage of the seat post at correspondingly lower expenditure of force. Vice versa, bracing the two frame parts when connecting them may be effected at lower expenditure of force via the greater leverage provided by the seat post. Finally in an advantageous manner, due to the fact that the seat post is in indirect or direct connection with the tensioning device, one obtains the effect that the seat post, together with the seat located therein, may in the disassembled state of the two frame parts additionally be pivoted relative to one of the frame parts, so that the stowing volume may be further reduced.

Herein the tensioning lever may moreover constitute the depressor indirectly or directly connected to the seat post of the bicycle frame.

The tensioning lever may be pivoted towards the other frame part for locking so that one contact portion thereof enters into a recess of the other frame part.

Further advantageous embodiments of the invention are the subject matters of the remaining subclaims.

In the following, preferred embodiments of the invention will be explained in more detail by referring to the drawing, wherein:

FIG. 6 is a tensioning bolt of the connecting means of FIG. 2;

Figure 1:
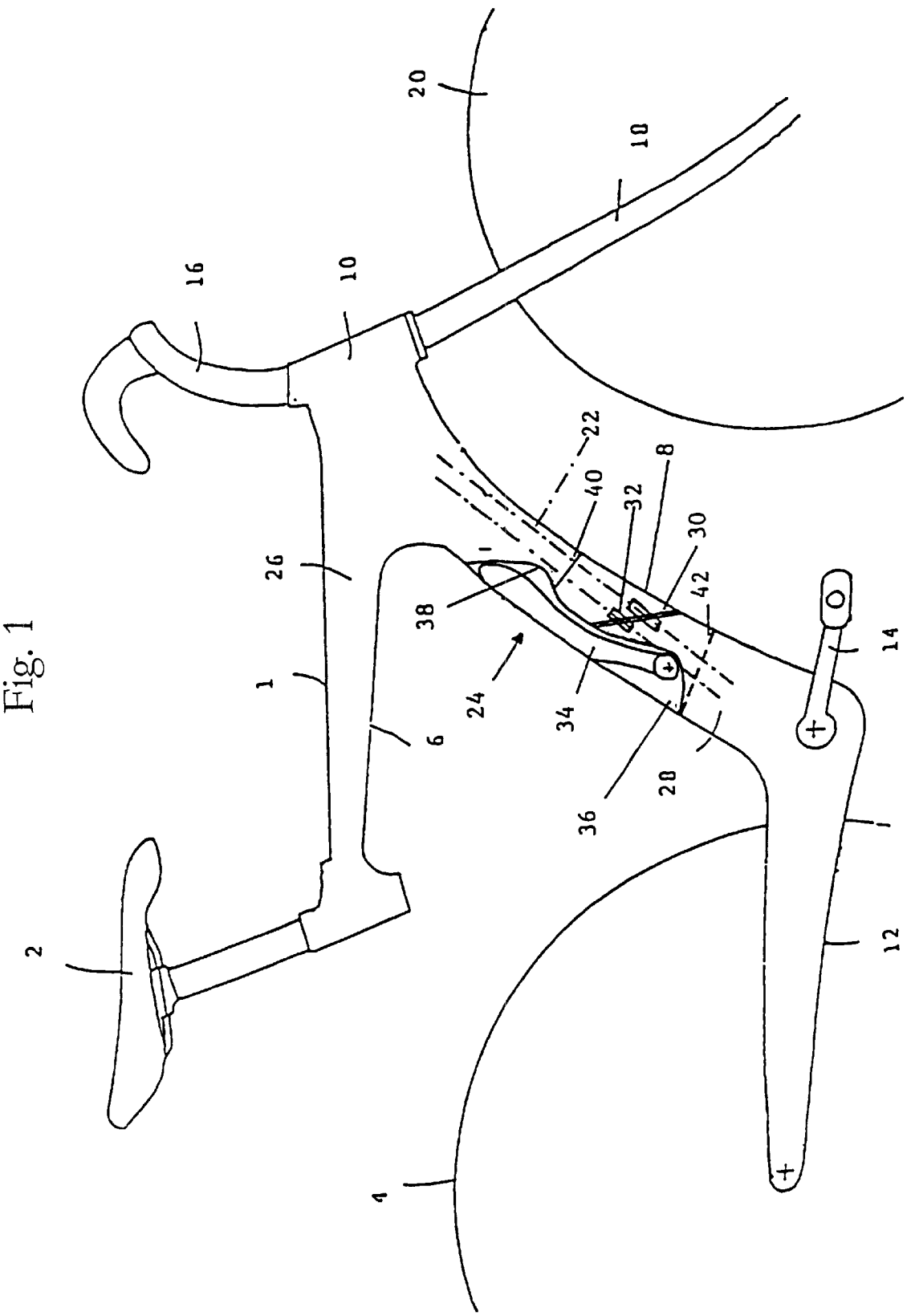
FIG. 1 is a schematic view of a bicycle equipped with the frame according to the invention.

FIG. 1 shows a schematic representation of a frame 1 according to the invention for a sports bicycle. This frame 1, in the shown embodiment, is manufactured of high-strength plastic, e.g., of carbon fibers, and therefore has an extremely low weight. For the represented bicycle a resilient frame type was chosen which does not employ a triangular frame closed in the conventional manner, but wherein a seat 2 and a mount for the rear wheel are arranged on freely projecting frame end sections thus presenting a certain inherent elasticity.

To this end, the frame may have a U-shaped design in the representation of FIG. 1, such that a crossbar 6 extending approximately horizontally and a down tube 8 obliquely extending in a downward direction merge into a head tube 10. The down tube 8 obliquely extending in a downward direction from the head tube 10 merges into a fork-type rear wheel reception 12, with only one arm of the rear wheel reception 12 being visible in the representation of FIG. 1. At the two end portions of the fork-type rear wheel reception 12, fork end pieces not represented here are provided for accommodating the rear wheel mounting. In the connecting range between the rear wheel reception 12 and the down tube 8, the bottom bracket bearing with the associated pedal cranks 14 is mounted. In the head tube 10, a handlebar 16 and a fork 18 for a front wheel 20 are mounted.

As is indicated in dash-dotted line in FIG. 1, Bowden wires 22 are guided in the frame 1 proper, which serve for actuation of the rear wheel brake and of the gear-shift mechanism not represented here, while connecting these elements with the corresponding means on the handlebar (brake levers, gear levers (grip-shift)). Due to their arrangement within the frame, the Bowden wires 22 are reliably protected against damage or soiling while the aesthetic appearance of the frame is moreover essentially more appealing than in the case of frames having the Bowden wires routed externally, along the peripheral surface of the frame.

The frame 1 according to the invention is provided with connecting means 24 whereby the down tube 8 may be split into two down tube portion, such that the frame 1 may be disassembled into two entirely separate frame parts 26, 28. Herein the bottom bracket bearing including the pedal cranks 14, the rear wheel reception 12, and the rear wheel are mounted on the frame part 28, whereas the seat 2, the handlebar 16, the fork 18 and the front wheel 20 are arranged on the upper frame part 26. In order to enable full separation, the Bowden wires are provided with releasable couplers or coupling means 32 in the range of the plane of separation 30 of the down tube 8.

Actuation of the connecting means 24 takes place with the aid of a tensioning lever 34 mounted on the lower frame part 28 in the shown embodiment, which in the locked condition, i.e., when the frame parts 26, 28 are coupled together, is pivoted towards the upper frame part 26 and contacts the outer circumferential surface of the latter. In order to allow for flush contact of the tensioning lever 34, the down tube 8 is in the pivoting/contact range of the pivoting lever 34 provided with a recess 36 into which the pivoting lever 34 enters in the represented position, such that the frame is as smoothly planar as possible, without any protruding parts, in the range of the plane of separation 30. The recess 36 is realised in the upper portion in the representation of FIG. 1 with an engagement recess 38, such that the pivoting lever 34 may be reached better in the represented position. As can furthermore be learned from the representation according to FIG. 1, the plane of separation 30 in the shown embodiment approximately extends in a vertical direction, i.e., in parallel with the vertical axis of the bicycle. The plane of separation may, of course, be situated in any other manner. For the sake of good order it should furthermore be noted that the invention is, of course, not restricted to the represented U-shaped bicycle frame but that any frame construction whatsoever may be employed.

Figure 2:
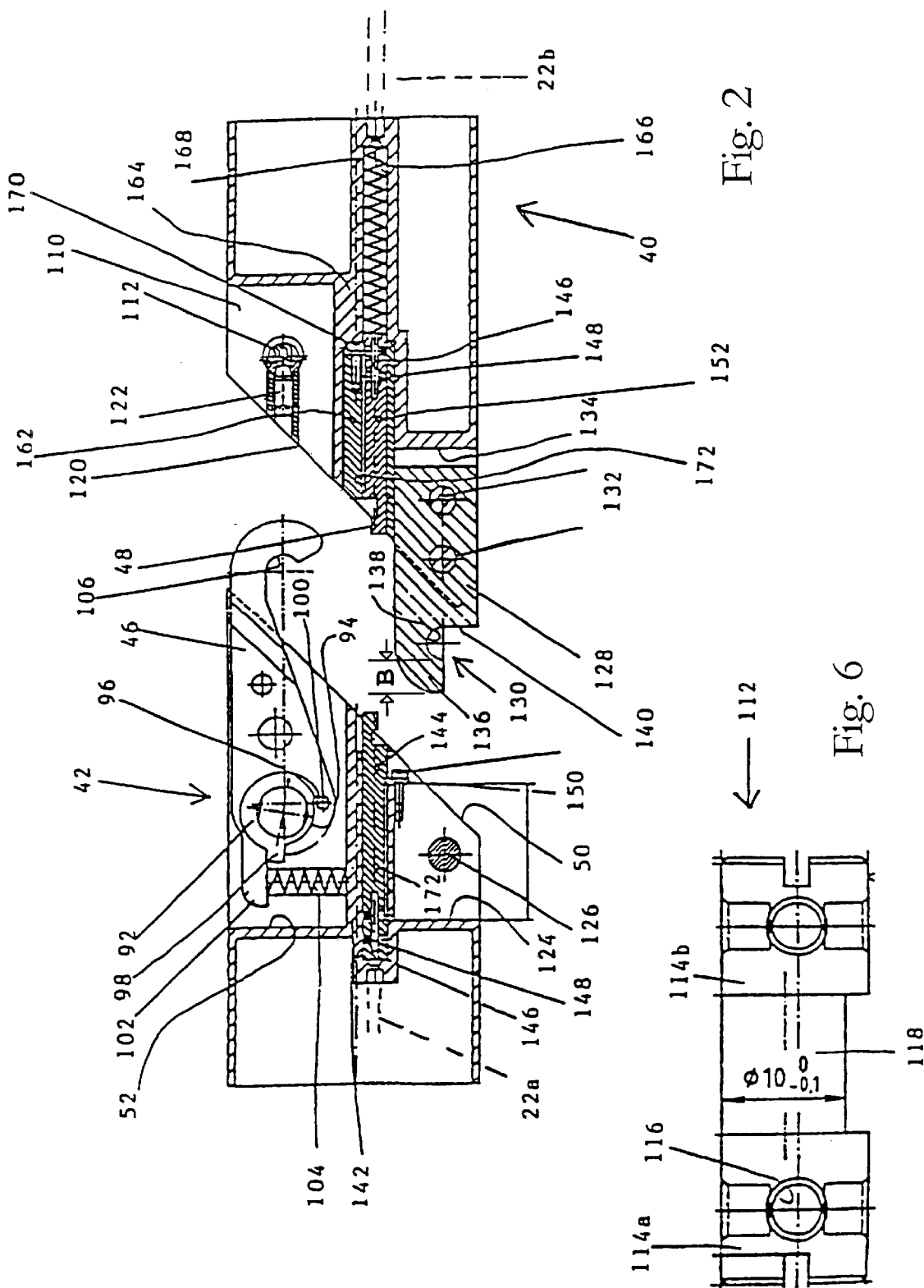
FIG. 2 is a sectional view of connecting means of the frame of FIG. 1.

As is indicated in phantom line in FIG. 1, the connecting means 24 are mounted not directly on the down tube portion, but the latter is provided with housings 40, 42 designed as inserts, along the front surfaces of which the plane of separation/contact 30 is formed, and wherein the mountings for the connecting means 24 are provided. Due to providing the housings 40, 42 in the range of the plane of separation 30, connecting means having extremely high strength and low weight are created. In FIG. 2 a longitudinal section of the housing parts 40, 42 formed as an insert is represented in the uncoupled condition. The two housings 40, 42 are cast of an aluminum alloy in lightweight construction. AS can be seen from the assembling illustration according to FIG. 3, the two housings 42 (lower housing) and 40 (upper housing) have elliptical cross-sections, with the longitudinal axis of the ellipse being situated in the vertical axis of the frame 1, whereby optimum flexural and torsional rigidity of the frame 1 is ensured.

Figure 3:
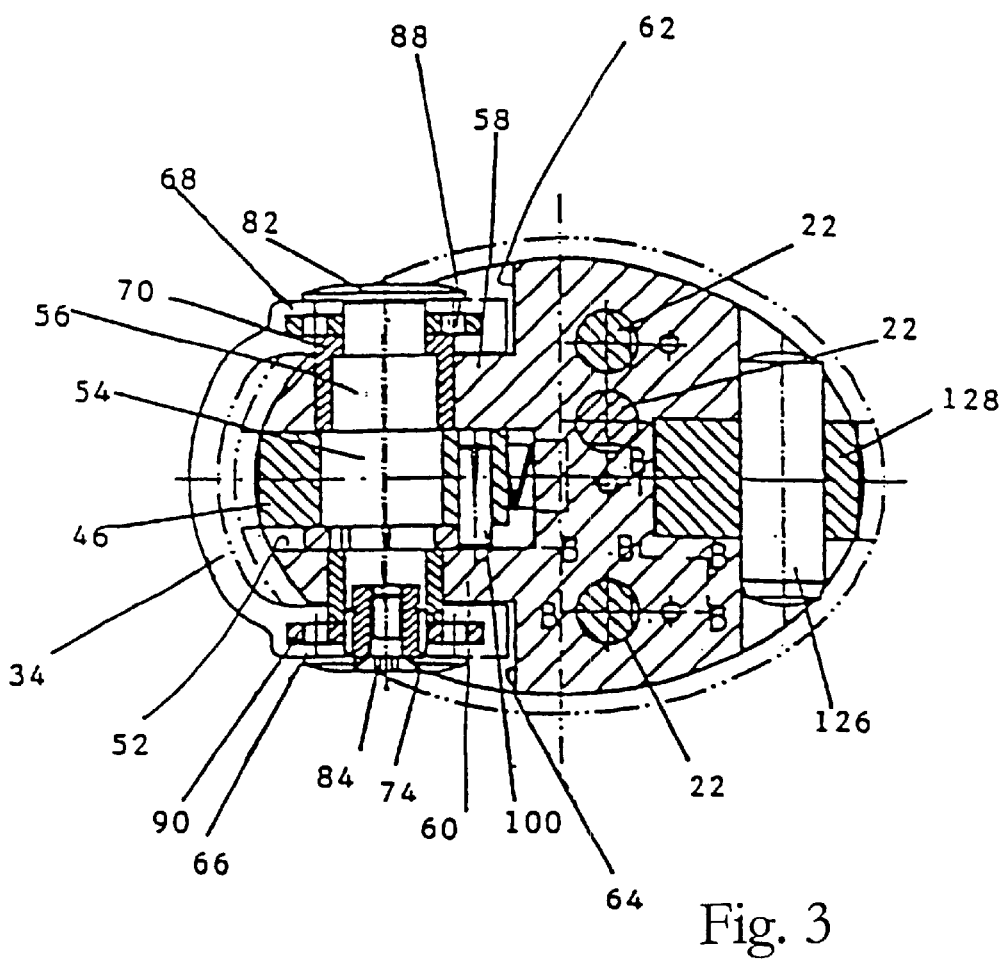
FIG. 3 is a sectional view of the connecting means of FIG. 2.

In accordance with FIG. 2, a tensioning hook 46 of the connecting means 24 is mounted in the lower housing 42. This tensioning hook 46 has an end portion 48 curved in the shape of a hook and protruding from a front surface 50 of the lower housing part 42, formed as an inclined surface, in the direction towards the upper housing part 40. The tensioning hook 46 is received in a reception recess 52 of the lower housing 42. A cross-sectional view of this reception recess 52 is shown in the representation of FIG. 3. This representation shows a sectional view along the line A—A in FIG. 4 (left). Accordingly, the tensioning hook 46 is mounted on the cam 54 of an eccentric shaft 56, the end portions of which extend through two mounting walls 58, 60 of the lower housing part 42 laterally defining the reception recess 52 and protruding into marginal recesses 62, 64 of the housing 42.

On these end portions of the eccentric shaft 56 protruding into the marginal recesses 62, 64 the tensioning lever 34 is mounted, with two mounting sections 68, 66 of the tensioning lever 34 being passed through by these end portions of the eccentric shaft 56. In the representation of FIG. 3, the tensioning lever 34 has a profile curved in the shape of a circular arc which is adapted to the radius of curvature of the housing outer walls, such that the portions of the housing in the range between the two end portions of the eccentric shaft 46 are encompassed by the tensioning lever 34 and the two mounting sections 66, 68.

For axial immobilisation of the eccentric shaft 56, one respective mounting bush 70, 72 is inserted into the mounting walls 58, 60.

Figure 5:
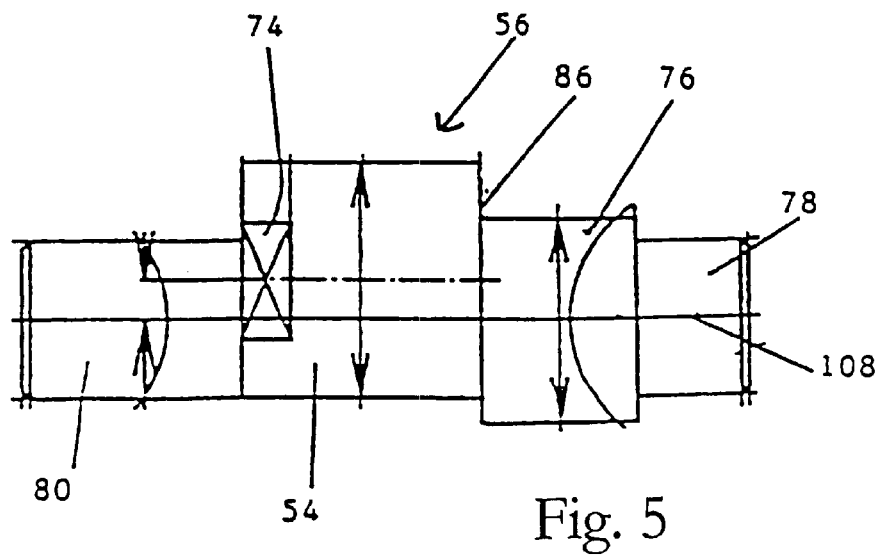
FIG. 5 shows an eccentric shaft of the connecting means of FIG. 2.

In FIG. 5 the eccentric shaft 56 is shown in enlarged representation.

Accordingly, the cam 54 having an approximately central position is formed with two diametrically arranged planar surfaces 74. The right-hand front surface of the cam 54 in FIG. 5 is followed by a centrical shaft portion 76 merging into a radially receded mounting collar 78 which extends through the above described mounting section 68 of the tensioning lever 34. The left-hand end portion of the eccentric shaft 54 in FIG. 5 is formed by a centrical mounting collar 80 which extends through the mounting wall 60 and the lower mounting section 66 in the representation of FIG. 3. The two front surfaces of the eccentric shaft 54 are provided with threaded bores not represented here, into which stop screws 82, 84 contacting the outsides of the mounting sections 66, 68 of the tensioning lever 34 may be screwed.

The upper mounting bush 70 in the representation of FIG. 3 is supported with the lower end portion (FIG. 3) on the cam front surface 86 between the cam 54 and the centrical shaft portion 76. The end portion of the mounting bush 70 which is removed from this front surface 86 encompasses with a radial collar the radial shoulder between the shaft portions 76, 78 of the eccentric shaft 56.

As can be seen from FIG. 3, the mounting sections 66, 68 of the tensioning lever 34 are each formed with one respective internal slot 88 serving for reception of a mounting disc 90. In the shown mounting position, the radial collar-side front surface of the mounting bush 70 is supported on the major surface of the mounting disc 90, i.e., the mounting bush 70 extends as far as the adjacent circumferential wall of the internal slot 88 in the mounting section 68.

In the range of the planar surfaces 74, there is fastened on the cam 54 a cam disc 92 whose inner bore is also formed with planar surfaces, such that the latter is connected as a unit in rotation with the eccentric shaft 56. The cam disc 92 (cf. FIG. 2) has a radially receded circumferential groove 94 having at one end thereof a radial shoulder 96 and at the other end a drive cam 98 which projects in the radial direction beyond the outer circumference of the cam disc 92. The tensioning hook 46 is rotatably mounted on the cam 54, with a stop bolt 100 projecting from the major surface represented in FIG. 2, which stop bolt may selectively be taken into contact with the radial shoulder 96 or with the drive cam 98. I.e., freedom of rotation of the tensioning hook 56 about the cam 54 is limited by contact of the stop bolt 100 against the radial shoulder 96 or against the drive cam 98.

In accordance with FIG. 2, the tensioning hook 46 comprises on the end portion removed from the hook-shaped end portion 48 a contact leg 102 contacted by a pressure spring 104 which is supported against the bottom of the reception recess 52. By this pressure spring 104 the tensioning hook 46 is biased into the represented basic position wherein the radial shoulder 96 contacts the stop bolt 100. By rotating the tensioning lever 34 connected as a unit in rotation with the eccentric shaft 56, the cam 54 is rotated such that the distance of the hook-shaped end portion 48—more precisely: of the hook face 106 of the tensioning hook 46—from the axis of rotation 108 (FIG. 5) of the eccentric shaft may be modified in accordance with the degree of eccentricity for applying or reducing a tensioning force. In FIG. 2, the tensioning hook 46 is in a position in which the distance between the hook face 106 and the axis of rotation 108 is minimum, such that in the assembled condition the maximum tensioning force is applied. Upon reverse pivoting of the tensioning lever 34, the drive cam 98 contacts the stop bolt 100, such that the rotational movement of the cam disc 92 is transferred to the tensioning hook 46 which is thus moved upwards and to the left in the representation according to FIG. 2. Coupling and uncoupling of the connecting means shall be explained in more detail below.

The upper housing 40 is—in the representation according to FIG. 2—in prolongation of the tensioning hook 46 provided with an engagement recess 110 into which the hook-shaped end portion 48 enters in the coupled condition. This engagement recess 110 is passed through in the transversal direction (perpendicular to the plane of drawing in FIG. 2) by a tensioning bolt 112 which is represented enlarged in FIG. 6. Accordingly, the tensioning bolt 112 comprises two centrical mounting collars 114*a*, 114*b* in each of which three blind bores 116 having a perpendicular relative arrangement are formed. Between the two mounting collars 114*a*, 114*b* a tensioning cam 118 is arranged whose center axis is offset with respect to the axis of the mounting collars 114*a,b*.

Fastening of the tensioning bolt 112 in the engagement recess 110 is achieved by fastening the two mounting collars 114*a*, 114*b* in the corresponding side walls of the engagement recess 110, wherein stud screws 122 may be screwed into these side walls from the obliquely extending front/ contact surface 120, the cylindrical end portions of which enter into one of the blind bores 116, such that the tensioning bolt 112 is fastened both in the axial direction and integrally in rotation in the upper housing 40. By means of the three blind bores 116 having a relative angular arrangement, the assembly position of the cam may be pre-selected, such that tolerances due to manufacture or wear owing to twisting of the tensioning cam 118 may be compensated. The curvature of the hook face 106 is adapted to the outer diameter of the tensioning cam 118, with the hook-shaped end portion 48 encompassing the cam 180 along about 150° in the coupled condition.

In accordance with FIG. 2, the lower housing 42 has in the lower range thereof a groove 124 through which a bolt 126 extends perpendicularly to the plane of drawing in FIG. 2, which bolt is press-fitted in the circumferential walls of the lower housing parts 42. The groove 124 merges into the front surface 50. In prolongation of the groove 124, in the upper housing 140 a hook 128 is fastened, the hook-shaped engagement section 130 of which protrudes beyond the front surface 120 toward the lower housing 42. The engagement section 130 comprises an insertion nose 136 having a width B selected such that the insertion nose 136 can be introduced into the groove 124 or withdrawn above the bolt 26 in the representation according to FIG. 2. The insertion nose 136 is followed by a supporting groove 138 opening in a downwardly direction (view according to FIG. 2) which continues into a transversal shoulder 140 extending crosswise with respect to the longitudinal axis of the hook 128. The co-operation of hook 128 and bolt 126 shall be explained in more detail hereinafter.

In accordance with FIG. 3, three Bowden wires 22 of the bicycle are routed within the down tube 8. In order to allow for disassembling of the frame 1, these Bowden wires must correspondingly be fashioned to be disassemblable. In the shown embodiment, the coupler 30 is provided for this purpose, whereby the respective two Bowden wire sections 22*a*, 22*b* may positively be connected in the lower housing 42 or in the upper housing 40, respectively. Inasmuch as the Bowden wires 22 have an identical structure, only one of these Bowden wires shall be discussed in the following.

In a through bore of a center wall 142 of the upper housing 42 a coupling member 144 is fastened which has at its left-hand end portion (view according to FIG. 2) a fastening bore 146 into which an end portion of the Bowden wire 22*a* may be introduced through the bottom of the center wall 42 and fastened by means of clamp screws 148. In the basic position represented in FIG. 2, the coupling member 144 contacts the bottom of the through bore of the center wall 142 and is displaceably guided in the direction towards the upper housing part 40. The displacement of the coupling member 144 out of the upper housing 42 is limited by means of a stop 150 which enters into a longitudinal groove 172 of the coupling member 144 and thus at the same time serves as a protection against torsion.

Figure 4:
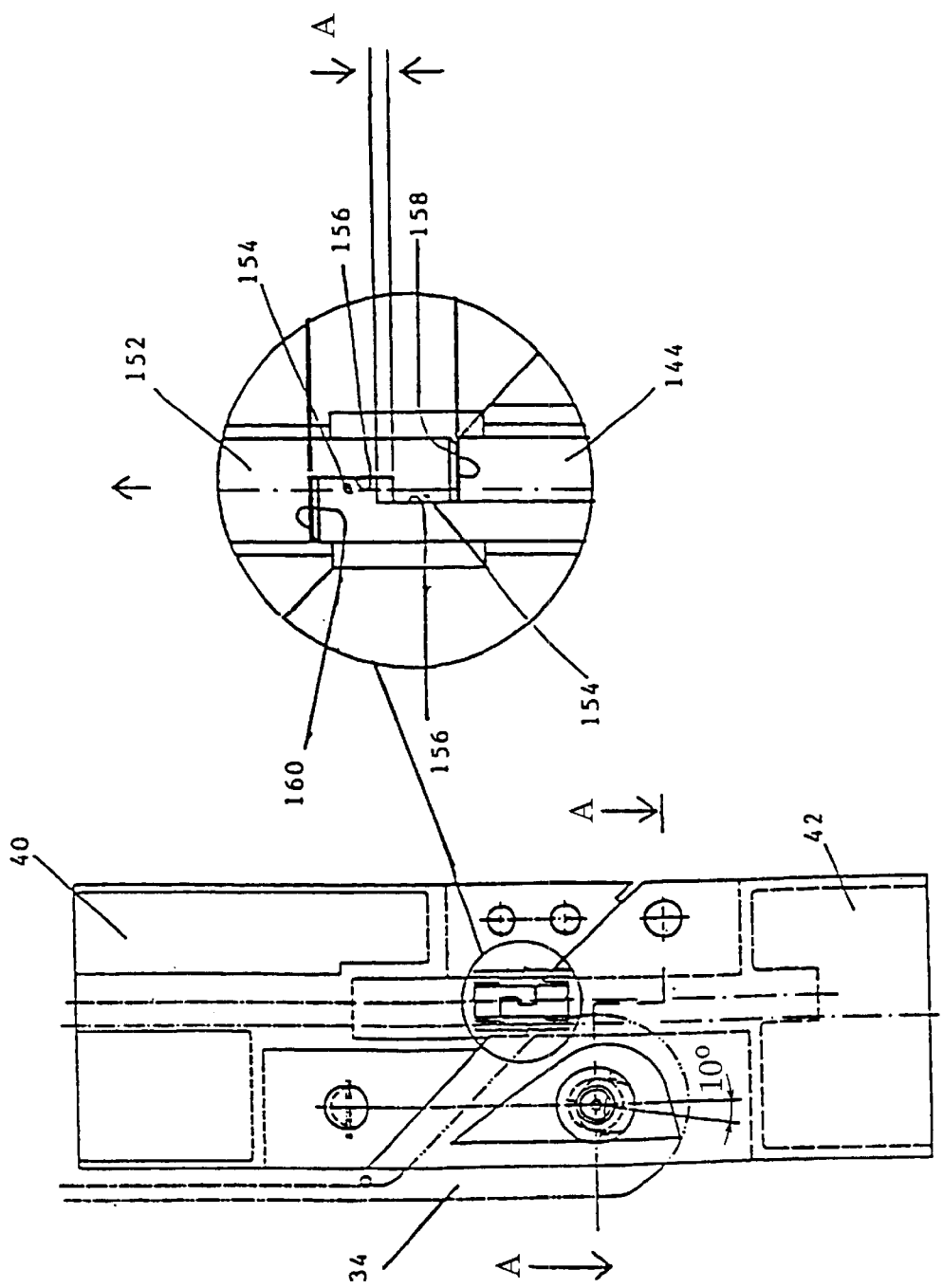
FIG. 4 shows the connecting means of FIG. 2 in the assembled condition.

In FIG. 4 the two housing parts 40, 42 are represented in the coupled condition, with the tensioning lever 34 positioned such that its actuating portion contacts the outer circumference of the upper housing part 40. The representation in accordance with FIG. 4 reveals that the coupling member 144 in the coupled condition is in operational engagement with a coupling member 152 mounted in the upper housing 40. The two coupling members 144 and 152 are formed to have mutually corresponding engagement section forming a toothing, with each coupling member 152, 144 in the shown embodiment being provided at its end portion With an engagement projection 154 extending crosswise with respect to the longitudinal axis and a correspondingly fashioned engagement groove 156. The axial length of these engagement projections 154 is somewhat less than the width of the engagement groove 156 of the associated coupling member. As can be seen from the representation in accordance with FIG. 4, the engagement projections 154 extend in the radial direction beyond the center axis of the coupler components 152, 144, such that the engagement grooves 156 equally have to have a corresponding depth.

In the coupled condition, the front surfaces 158, 160 contact the adjacent side walls of the engagement groove 156. The difference A of length between the axial length of the engagement projection 154 and the engagement grooves 156 results in a certain dead stroke (play), with the result that upon actuation of the Bowden wire the coupling member 152 moves in the direction of the arrow (FIG. 4) and contacts the lateral surface of the engagement projection 154 of the coupling member 144 only after the dead stroke A. This dead stroke is, however, selected to be comparatively small so as not to have any practical effect on the gear-shifting or braking process. If desired, this dead stroke may also be omitted. The difference A in length does, however, render lateral release/assembly of the coupling members 152, 144 easier.

As can be seen from the representation in accordance with FIG. 2, the coupling member 152 is guided in a housing insert 162 fastened in a center wall 164 of the upper housing part 40. The housing part 162 includes a guide bore for the coupling member 152, which merges into a through bore 166 of the center wall 144. The Bowden wire 22b extends through the through bore 166 and is immobilised by its end portion—as in the case of the coupling member 144—by means of clamp screws 148 in a fastening bore 146. In the embodiment represented in FIG. 2, the coupling member 152 is biased towards the other coupling member 144 by means of a pressure spring 168 supported against a front surface of the through bore 166. The axial displacement of the coupling member 152, in turn, is limited by a stop 170 fastened at the right-hand end portion of the housing insert 162 in the representation of FIG. 2 and entering with an engagement section thereof into a longitudinal groove 172 of the coupling member 152 to thus also serve as a protection against torsion. The above described coupler 32 may basically be utilised for connection of any shaped articles and is therefore not at all limited to use in connection with a bicycle frame.

The function of the above described components shall be explained by referring to the following figures.

Figure 7:
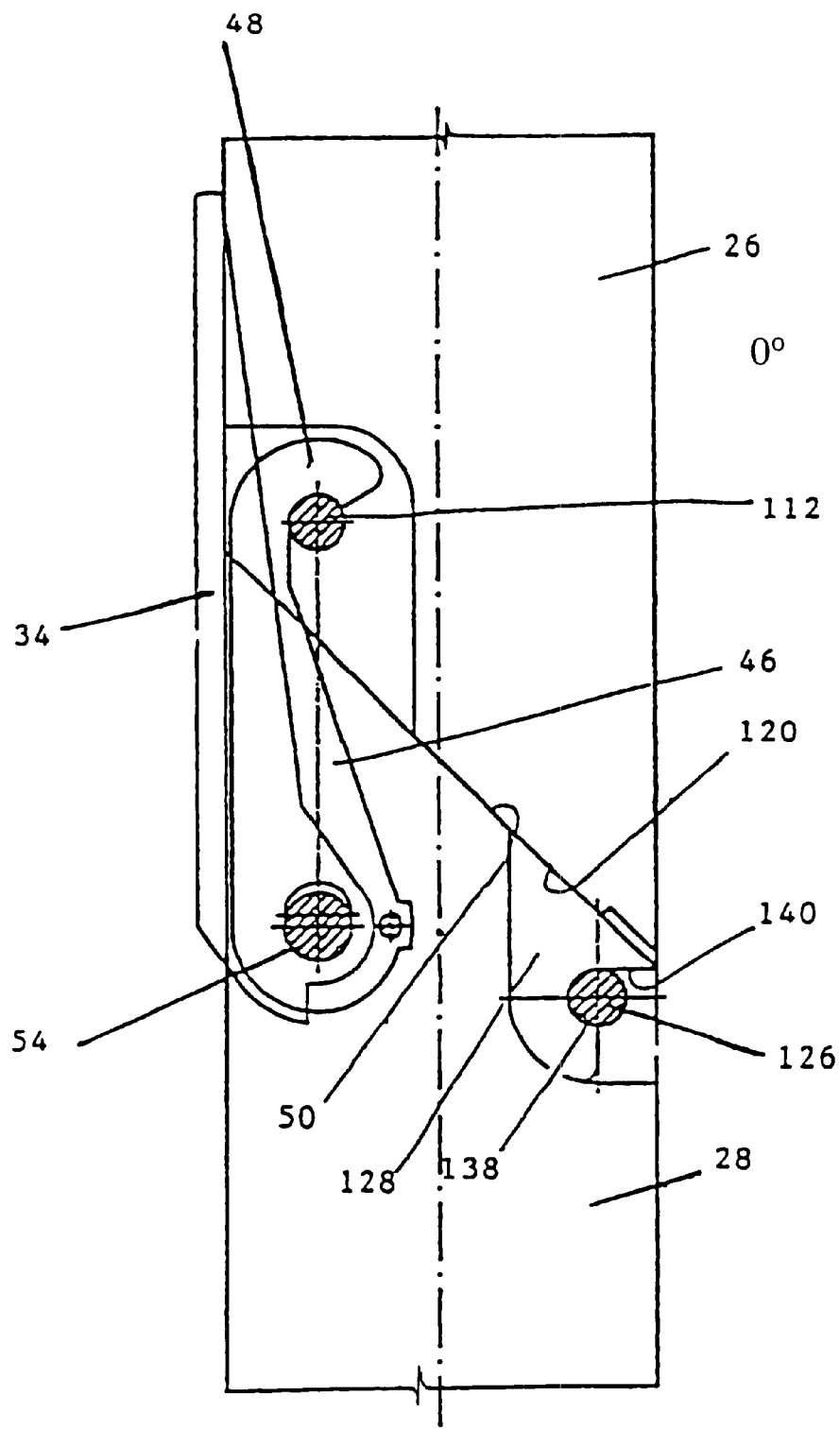
FIGS. 7 to 12 show movement phases of the connecting member of FIG. 2.
Figure 8:
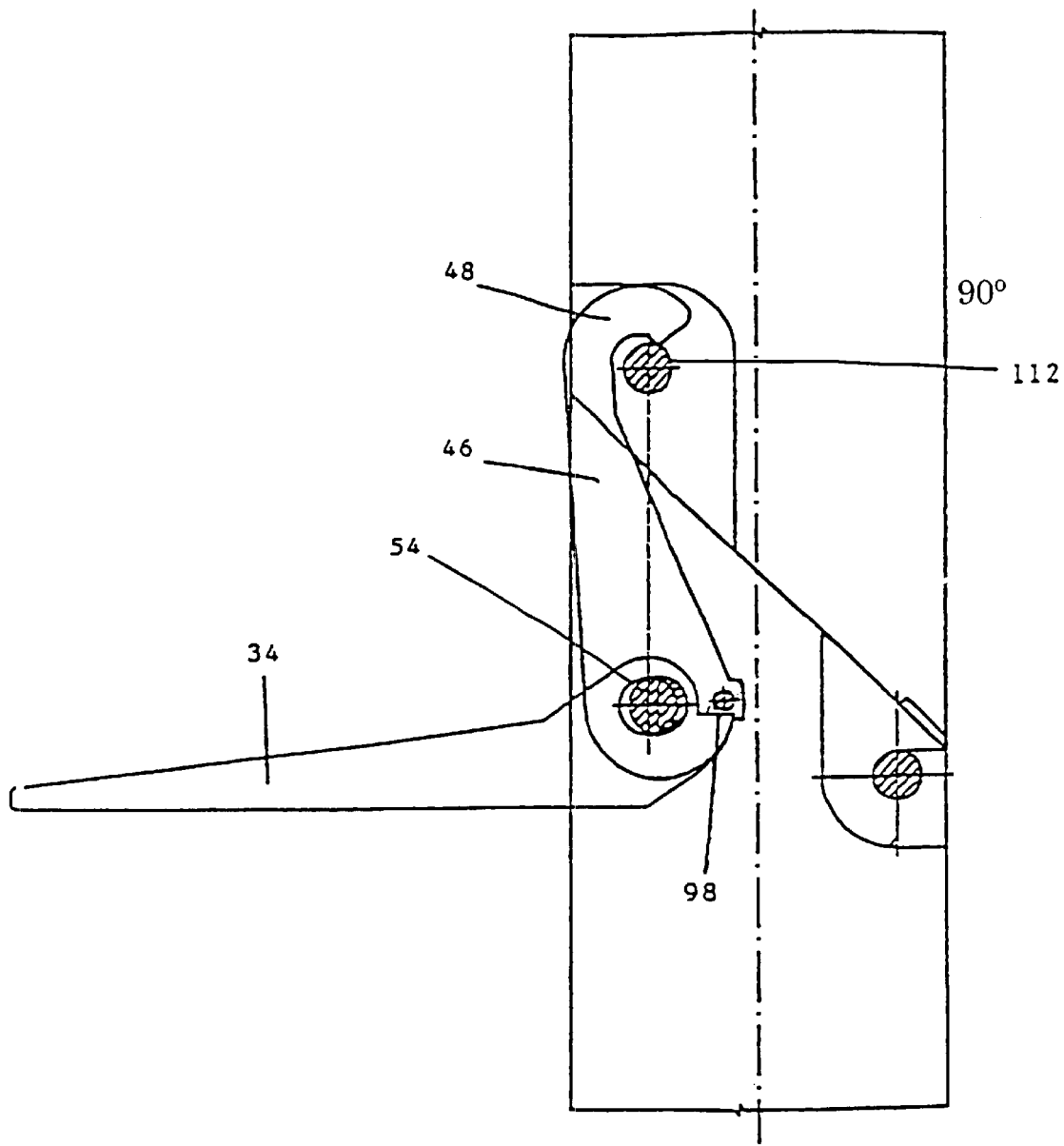

FIG. 7 shows the frame 1 of the bicycle in the coupled condition, with the two frame parts 26 and 28 being coupled to each other. The two down tube portions contact each other along the front surfaces 50 and 120. The hook 128 rests on the bolt 126 by the supporting groove 138 and a region of the transversal shoulder. The tensioning lever 34 is rotated towards the frame part 26, such that the tensioning hook 46 is in its tensioning position wherein a tensioning force may be transferred through the latter to the front surfaces 50, 120, and through the hook 128 to the bolt 126. In this pivotal position, the center axis of the cam 54 assumes the position farthest removed from the tensioning bolt 112, such that the hook-shaped end portion 48 is braced against the tensioning bolt 112. In order to release the connection, the tensioning lever 34 is pivoted by about 90°, whereby the cam 54 is also rotated by 90° and the distance between the center axis of the cam 54 and the tensioning bolt 112 is correspondingly reduced. In the representation in accordance with FIG. 8, the center axis of the cam 54 is arranged to the right of the center axis of the eccentric shaft 56. Owing to this rotational movement of the cam 54, the hook-shaped end portion 48 of the tensioning hook 46 is raised off the tensioning bolt 112, so that merely a slight contact along an edge of the hook-shaped end portions 48 exists. The relative position of the two down tube portions in the representation according to FIG. 8 is not changed yet in comparison with the one of FIG. 7.

Figure 9:
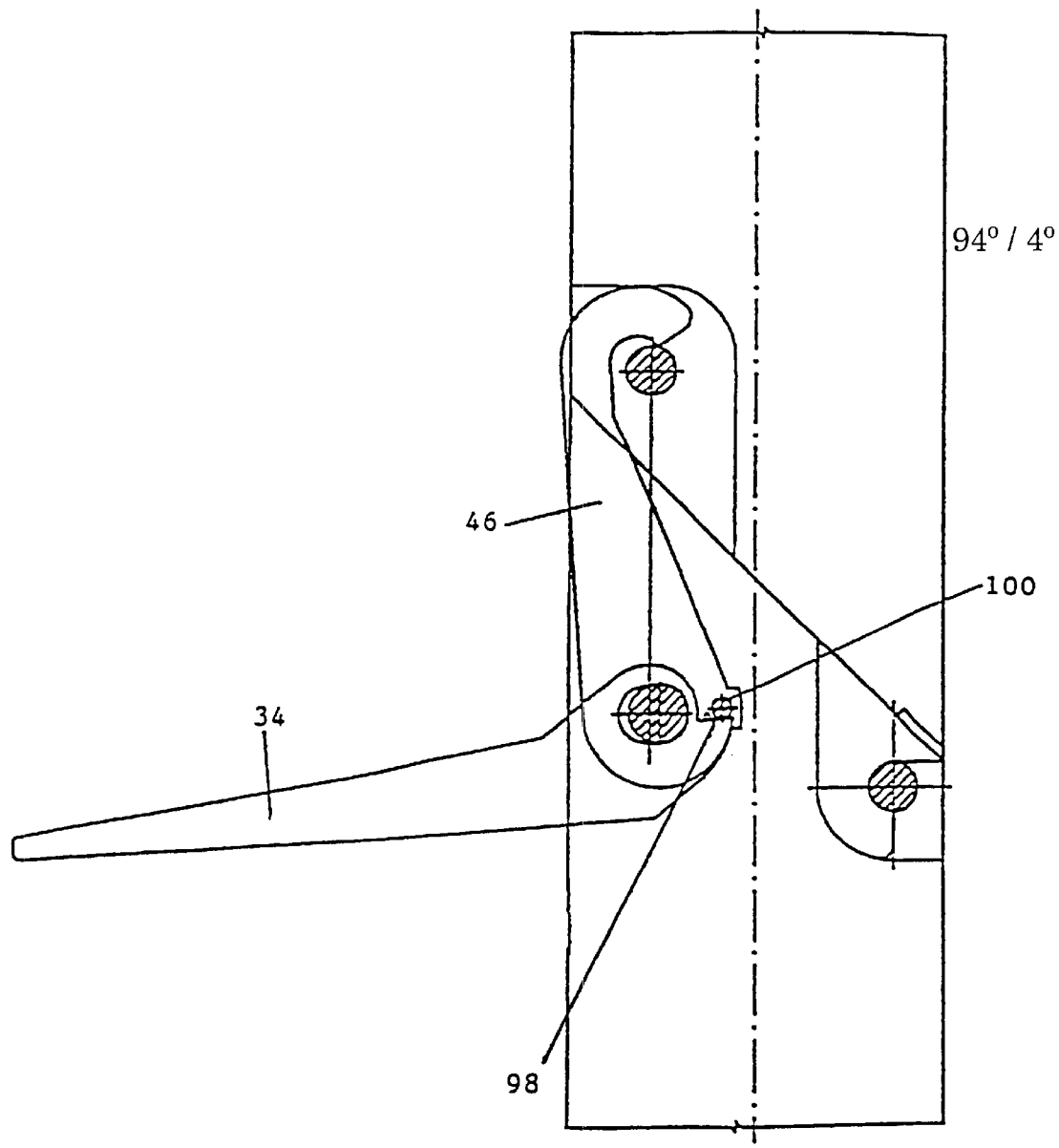
Figure 10:
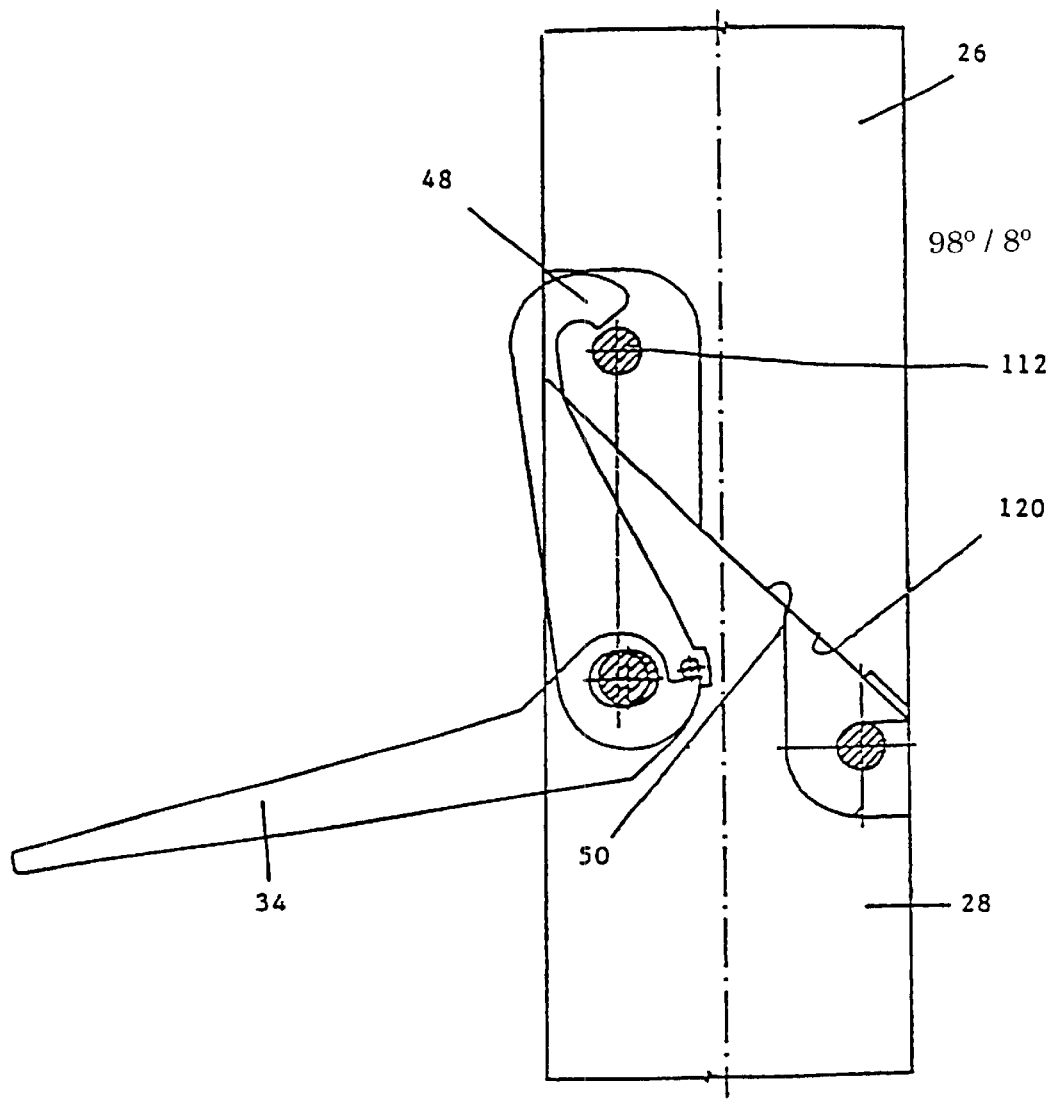
Figure 11:
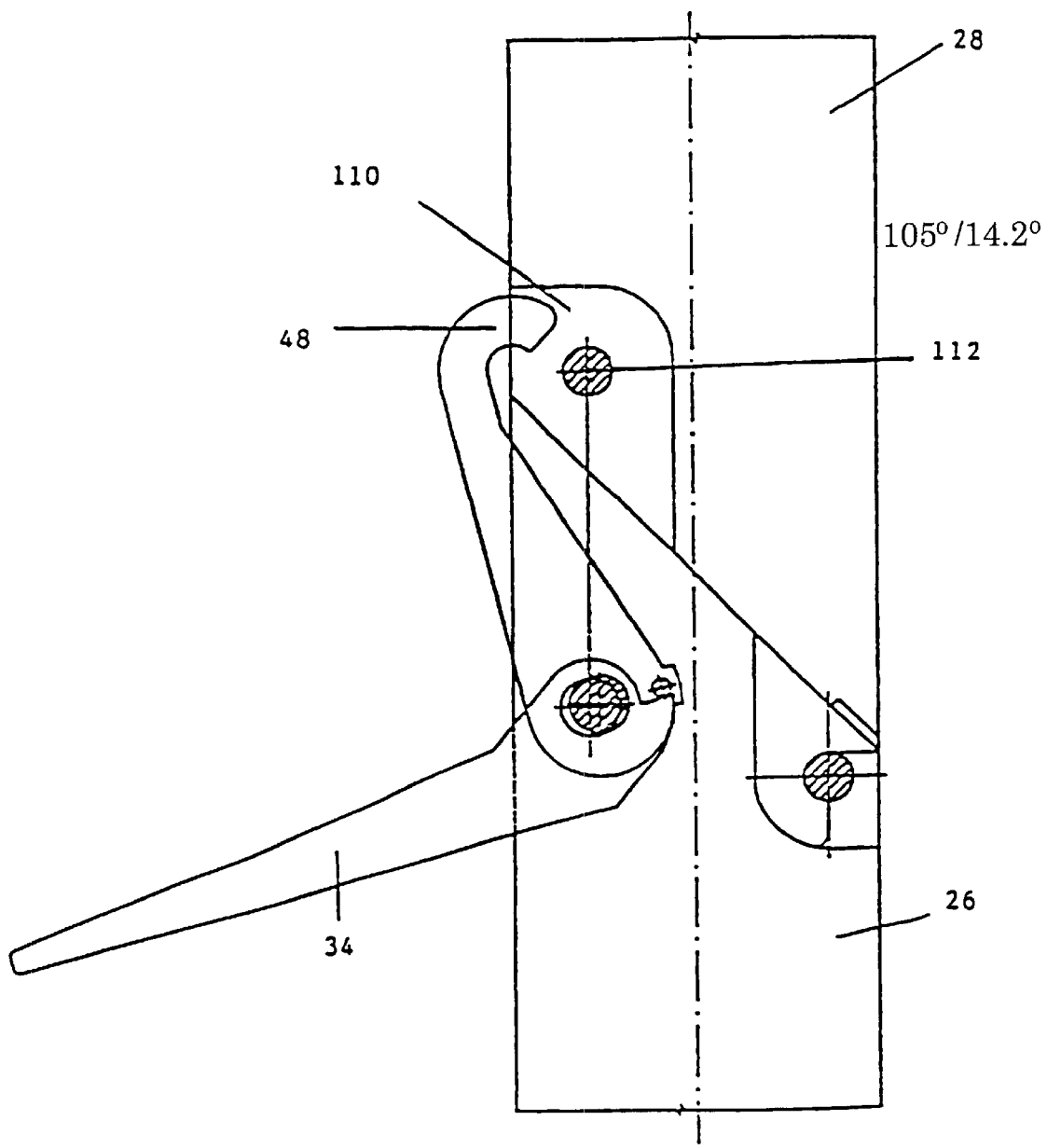
Figure 12:
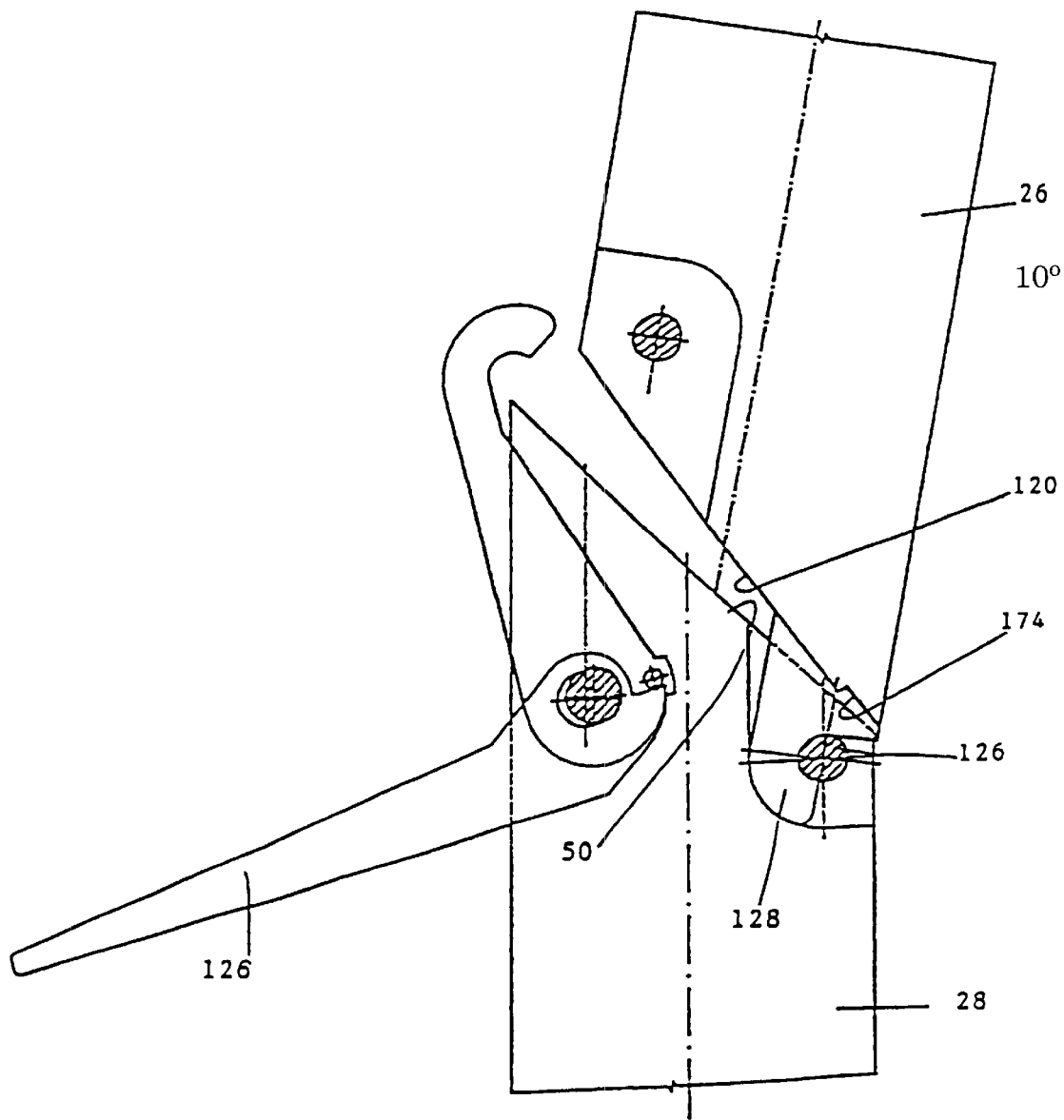
Figure 13:
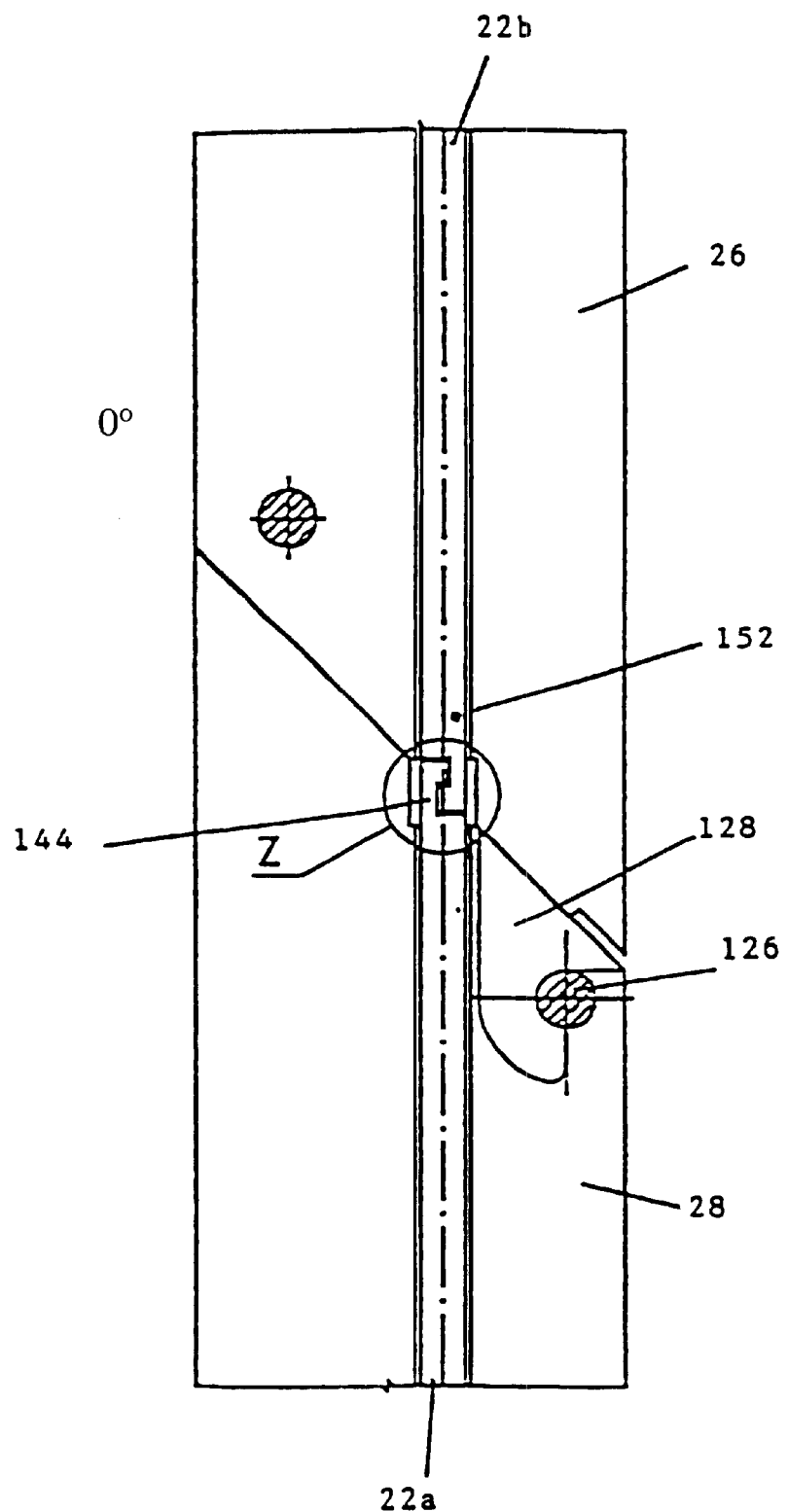
FIGS. 13 to 16 show movement phases of coupling means of the connecting member of FIG. 2.
Figure 14:
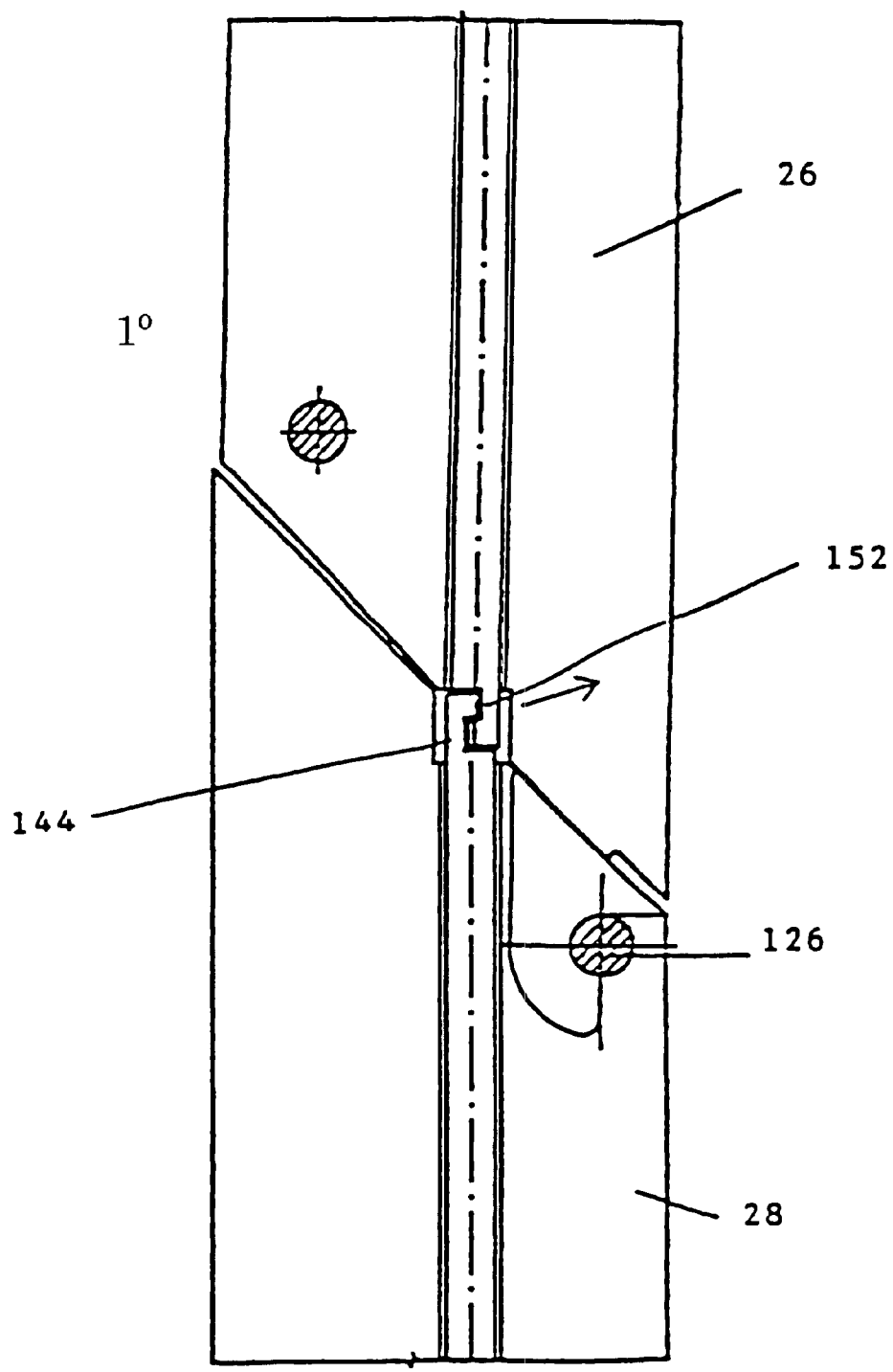
Figure 15:
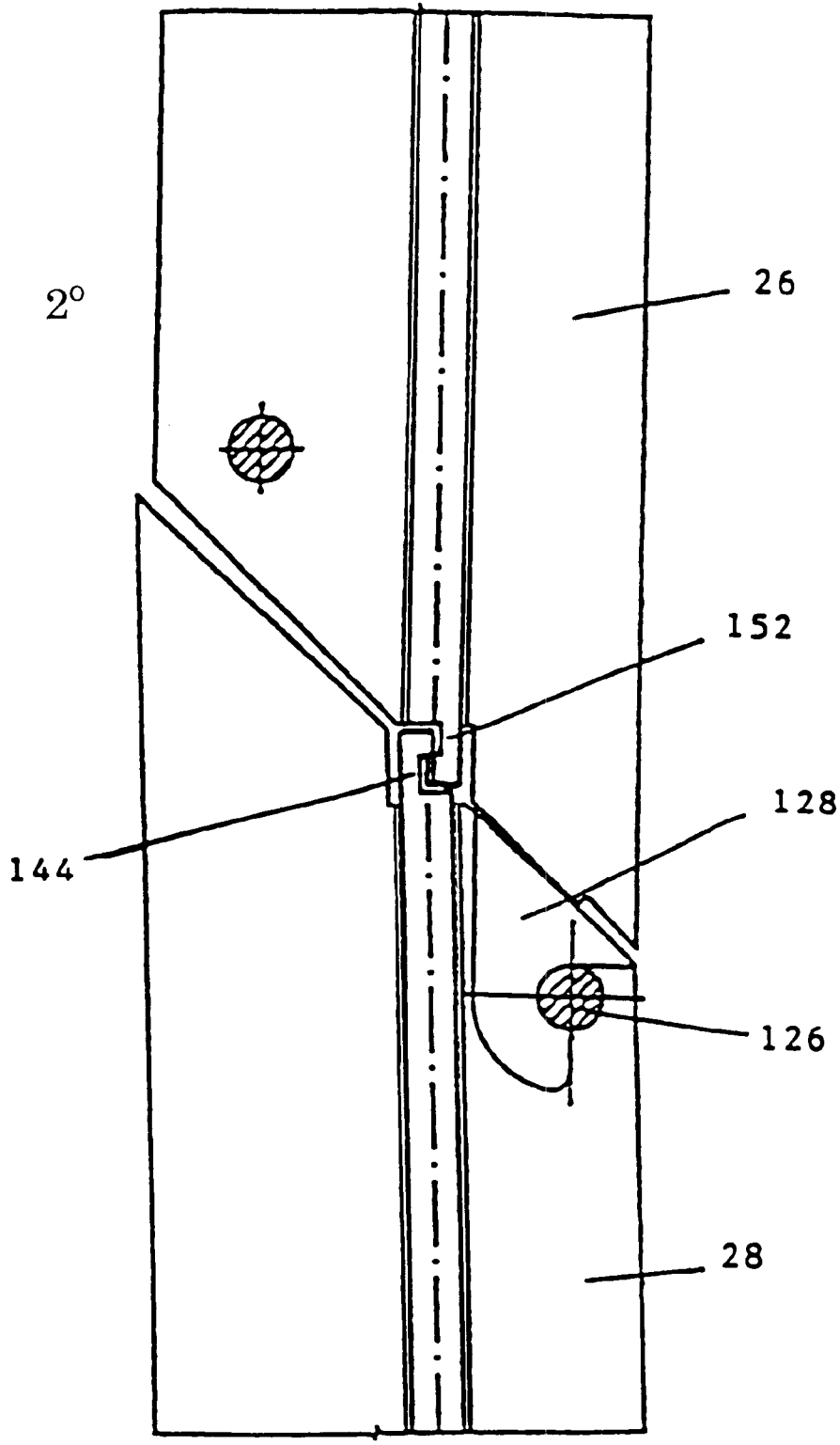
Figure 16:
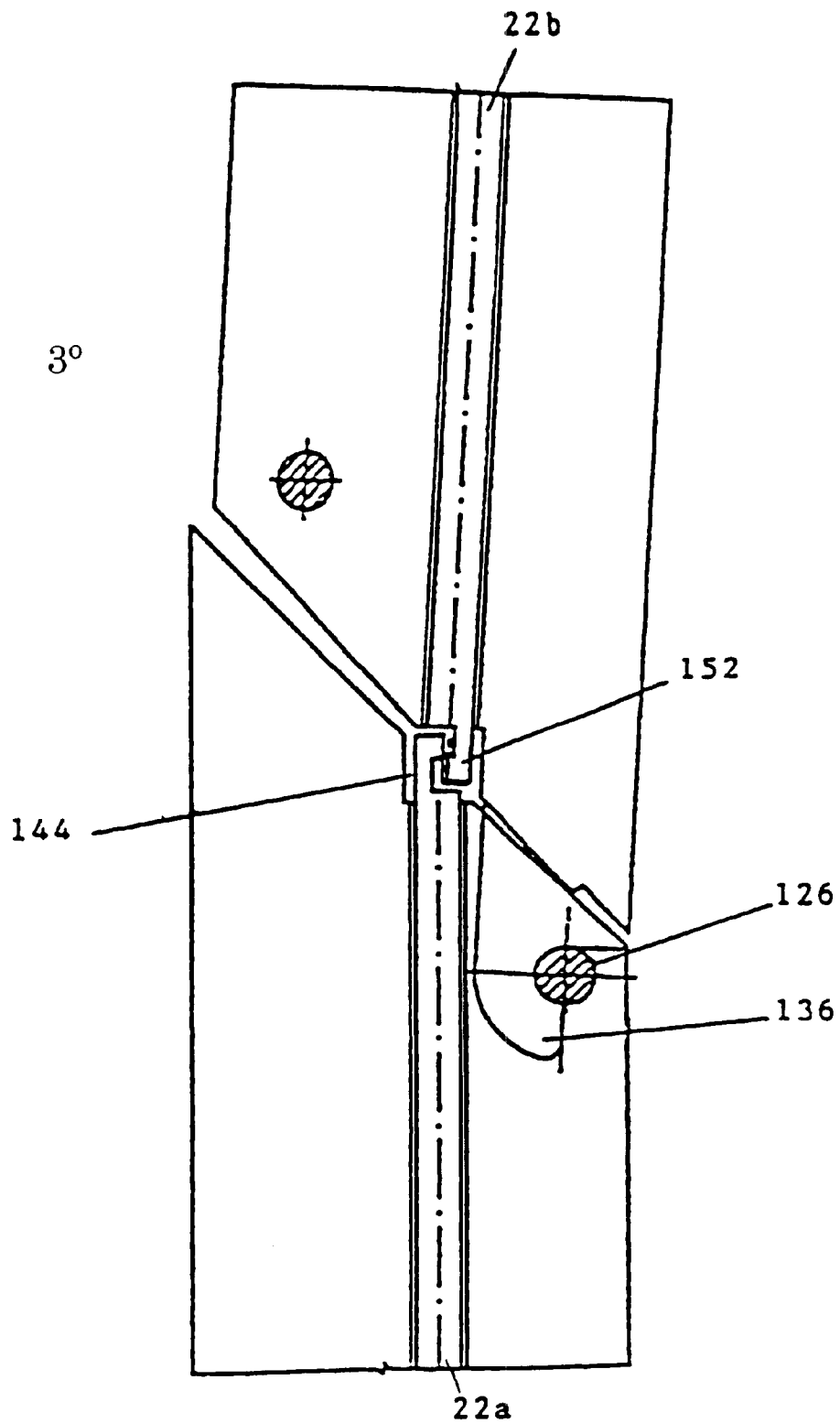

Upon further pivoting the tensioning lever 34, the drive cam 98 contacts the stop bolt 100, so that the tensioning hook 46 is pivoted to the left in the direction of the arrow in the representation according to FIG. 9. Upon further pivoting (FIG. 10) the tensioning lever 34, engagement between the tensioning bolt 112 and the hook-shaped end portion 48 of the tensioning hook 46 is released such that no more forces are transferred through the tensioning device in the direction towards the front surfaces 50, 120. In the final pivotal position of the tensioning lever 34 as represented in FIG. 11, the tensioning bolt 112 is fully released, while the hook-shaped end portion 48 has moved almost entirely out of the engagement recess 110. The frame may now be lifted off by pivoting the frame part 26 about the bolt 126, wherein a recess 174 in the bottom right part (view according to FIG. 12) of the front surface 120 allows for collision-free relative rotation, with the two front surfaces 120, 50 consequently moving apart in a wedge configuration. During this rotating movement the frame part 26 rests on the bolt 126 through the intermediary of the hook 128. The frame parts 26, 28 may then be separated from the lower frame part 28 by further pivoting and lifting off the upper frame part 26 to be fastened on a roof rack or even stowed away in a relatively small trunk or spare bench seat.

Coupling of the two frame parts 26, 28 is effected in the reverse manner, by initially placing the hook 128 on the bolt 126, subsequently contacting the front surfaces 50, 120 against each other by pivoting them, and then applying the tensioning force by rotating the tensioning lever 126.

In FIGS. 13 to 16 the coupling processes of the two coupling members 152, 154 carried out in the above described sequence of movements are represented. In the locked condition, i.e., when the tensioning lever 34 was rotated (FIG. 7), the engagement projections 154 and engagement grooves 156 engage each other in the manner represented in FIG. 4, such that upon actuation of a Bowden wire 22 the axial movement of part 22b by way of the coupling members 152, 154 is transferred to the Bowden wire 22a. Herein a maximum stroke of about 40 mm is provided, which is predetermined through the length of the recess 174. Following release of the tensioning device and a first small pivoting movement of the frame parts 26 relative to the frame part 28 (cf. FIG. 14) about the bolt 126, the engagement grooves 156 and engagement projections 154 are moved apart in the direction of the arrow in FIG. 14, wherein the frame part 26 is moved about the bolt 126. It is only the above mentioned play A between the two coupling members 152, 154 that allows for collision-free pivoting, for otherwise the corresponding front surfaces would slide off each other, with the pressure spring 168 also permitting a certain compensation in the rotating movement. Upon further pivoting frame part 26 relative to frame part 28, the claw-shaped engagement sections (engagement projections 154, engagement grooves 156) are further moved apart, with a relative rotation by 2° of frame part 26 relative to frame part 28 having taken place in FIG. 15. Upon a relative rotation of 3° in accordance with FIG. 16, engagement between the two coupling members is already neutralised, such that the Bowden wire sections 22a, 22b are uncoupled. The frame part 26 may then be pivoted further until the insertion nose 36 may be released from the bolt 126.

Assembly is carried out in the reverse manner.

The inventive design of the coupling means including the coupling members 144, 152 arranged coaxially with respect to the Bowden wires 22a, 22b allows for extremely compact design of the Bowden wire guidance, with virtually no necessity of having to provide additional aids for connecting the coupling members 152, 144, but merely a relative movement—here: pivoting movement—having to be enabled in order to take the opposed engagement sections of the coupling members 152, 144 into operational connection with each other. These coupling means may also be employed for other connections.

In order to prevent inadvertent release of the connecting means, the tensioning lever 34 may be provided with a push-button safety or any other safety. Moreover a suitable lock may be formed in order to prevent the frame from separating into two frame parts 26, 28. Even where the tensioning lever 34 was inadvertently released, the two frame parts 26, 28 cannot move apart because the hook 128 is pressed onto the bolt 126 by the driver's weight, and the two front surfaces 50, 120 are pressed against each other. The hook 128 is designed such that axial offset of the two frame parts 26, 28 is precluded.

Figure 17:
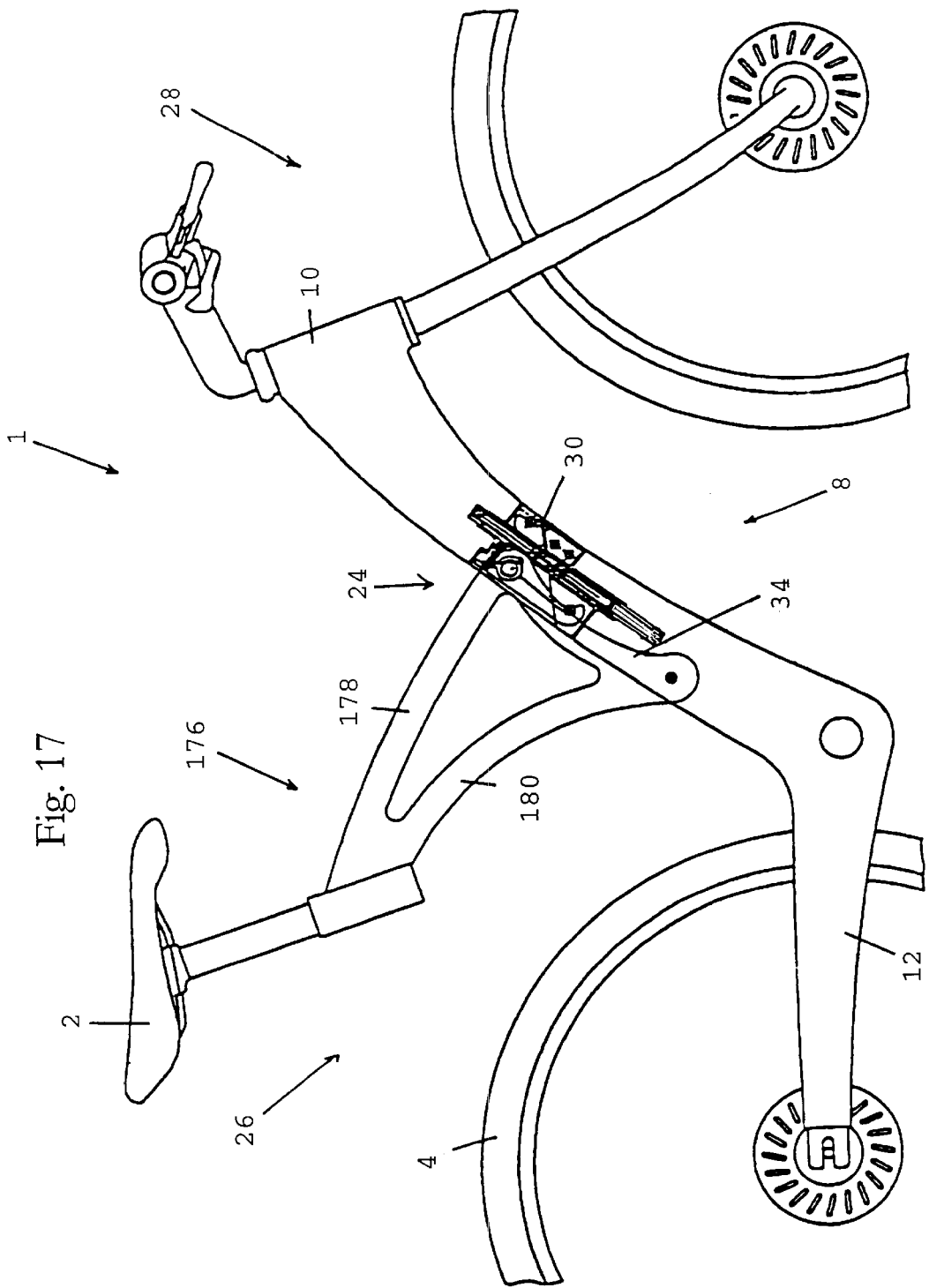
FIG. 17 is a schematic partial view of a bicycle equipped with another embodiment of a frame according to the invention.

FIG. 17 shows another embodiment of a bicycle frame in accordance with the invention, wherein inadvertent release may be prevented in a particularly simple, secure and elegant manner without having to make use of a push-button safety or any other safety or a lock in order to keep the frame from separating into the two frame parts.

In FIGS. 17 to 24, components or portions identical or functionally equivalent to parts or portions in FIGS. 1 to 16 are designated by identical reference numerals, with a repeated detailed description thereof being omitted here.

FIG. 17 shows a schematic representation of the second embodiment of the frame 1 for a sports bicycle. The seat 2 and the mounting of the rear wheel 4 are again arranged on freely protruding frame end sections which thus present a certain, inherent elasticity.

The frame 1 is essentially L-shaped with the down tube 8 obliquely extending from the head tube 10 in a downward/rearward direction and with the rear wheel reception 12 essentially extending horizontally.

The seat 2 is—as already mentioned—arranged at the free end of a seat post 176 which extends substantially centrally starting out from the down tube 8.

Figure 20:
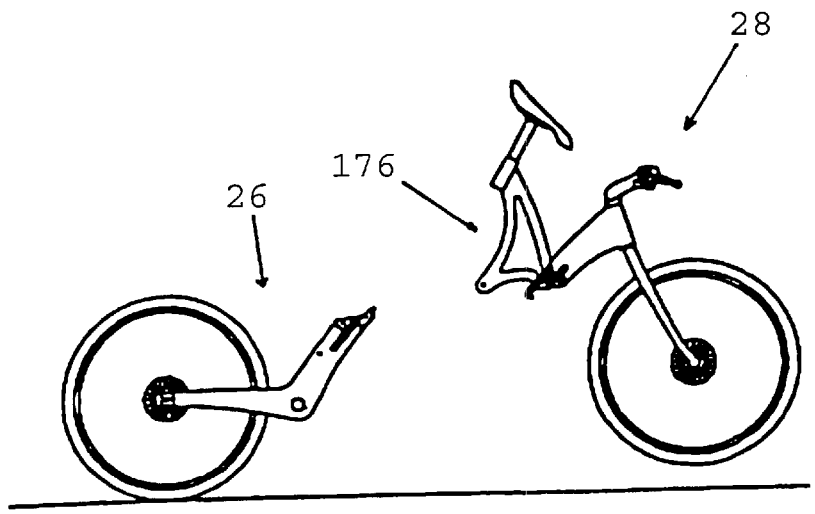

The frame 1 is again provided with the connecting means 24 whereby the down tube 8 may be separated into two down tube portions, so that the frame 1 may be disassembled into the two entirely separate frame parts 26 and 28 (FIG. 20). Here, as well, the Bowden wires are in the range of the plane of separation 30 of the down tube 8 preferably provided with the releasable couplers or coupling means described further above.

Actuation of the connecting means 24 is effected with the aid of the tensioning lever 34 which is mounted at the upper frame part 28 and is pivoted towards the lower frame part 26 in the locked condition, i.e., when the frame parts 26 and 28 are coupled with each other, and in contact with the outer circumferential surface.

Figure 18:
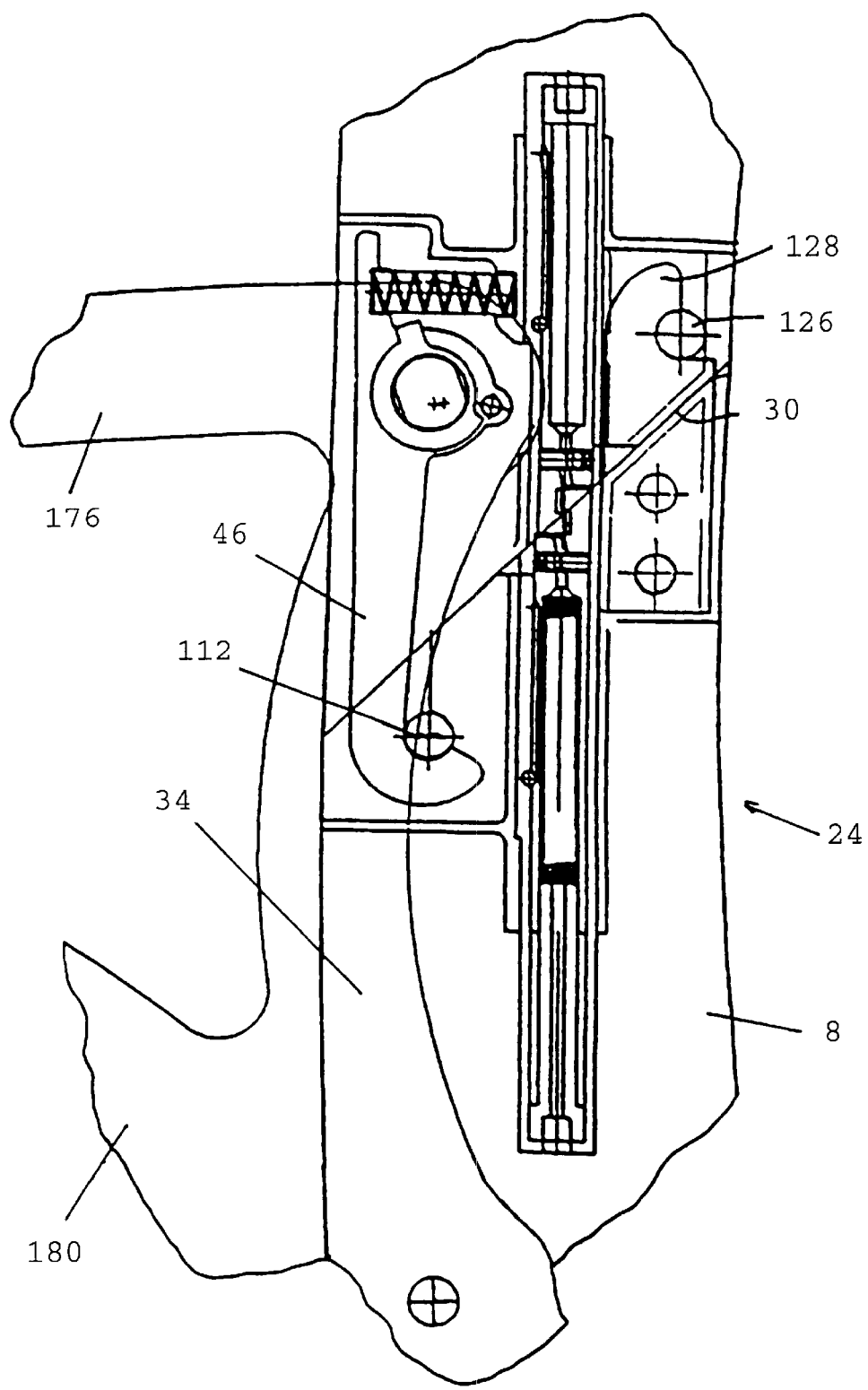
FIG. 18 is an enlarged, partly cut-away representation of connecting means of the frame of FIG. 17.
Figure 19:
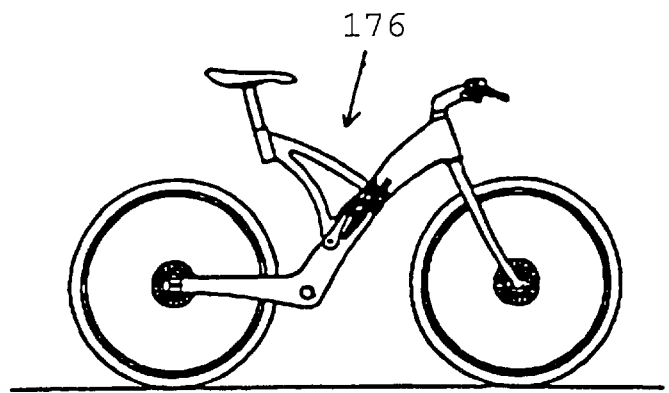
FIGS. 19 to 21 show the sequence upon separation of the two frame parts of FIG. 17 or FIG. 18.
Figure 21:
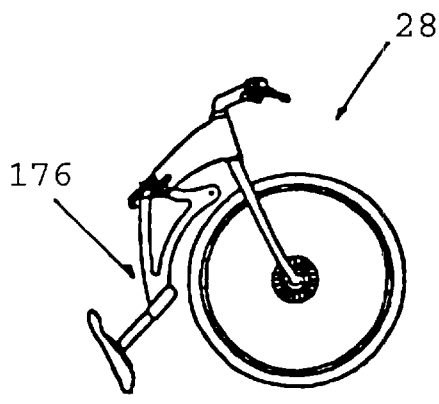

As can be seen from FIG. 17, and in particular FIG. 18, the seat post 176 is constructed in the form of a triangle having two cantilevers 178 and 180 that extend in the direction towards the frame end sections, or of the seat 2 located there, connected to each other by the tensioning lever 34 that acts as a depressor at the end opposite the end portion in the range of the down tube 8. A clockwise rotational movement of the seat post 176 in FIG. 17 about the longitudinal axis of the cam causes the tensioning lever 34 to be concurrently driven, and thus—as was mentioned above—an opening movement of the tensioning hook such that the two frame parts may be separated from each other. This sequence is also represented in FIGS. 19 to 21, wherein FIG. 19 shows the connecting means in the connected condition similar to FIG. 18, FIG. 20 shows the two separated frame parts, and FIG. 21 shows the front frame part by itself. Particularly FIG. 21 reveals that following the completed separating process, the two frame parts of the seat post 176 together with the seat 2 mounted thereon may be pivoted about the axis of the cam towards the front wheel 20, such that the stowing volume especially of the front frame part is substantially reduced.

In the connected condition of the two frame parts 26 and 28 in accordance with FIG. 19, the weight of a person sitting on the seat 2 acts on the connecting means through the intermediary of the seat post 176 in such a manner that the depressor, or the tensioning lever 34, respectively, is pushed into fixed contact with the down tube 8. Even in the case of high strains acting on the connecting means, such as vibrations or impacts likely to occur, for example, in the case of mountain bikes, the connecting means are thus protected against inadvertent opening through a rotating movement of the tensioning lever 34.

Figure 22:
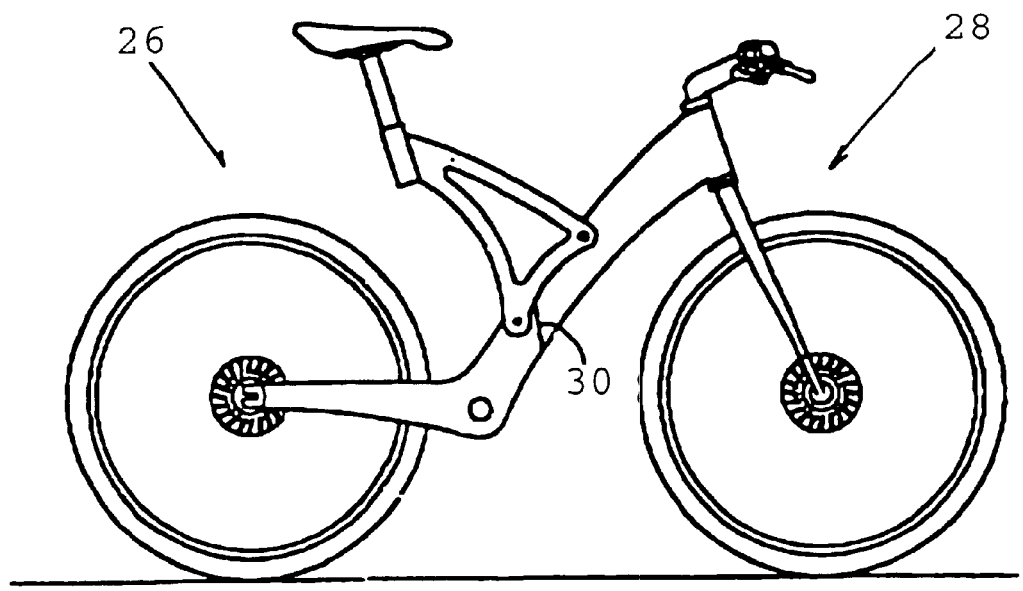
FIGS. 22 and 23 show two different embodiments of a bicycle equipped with the frame of FIG. 17.
Figure 23:
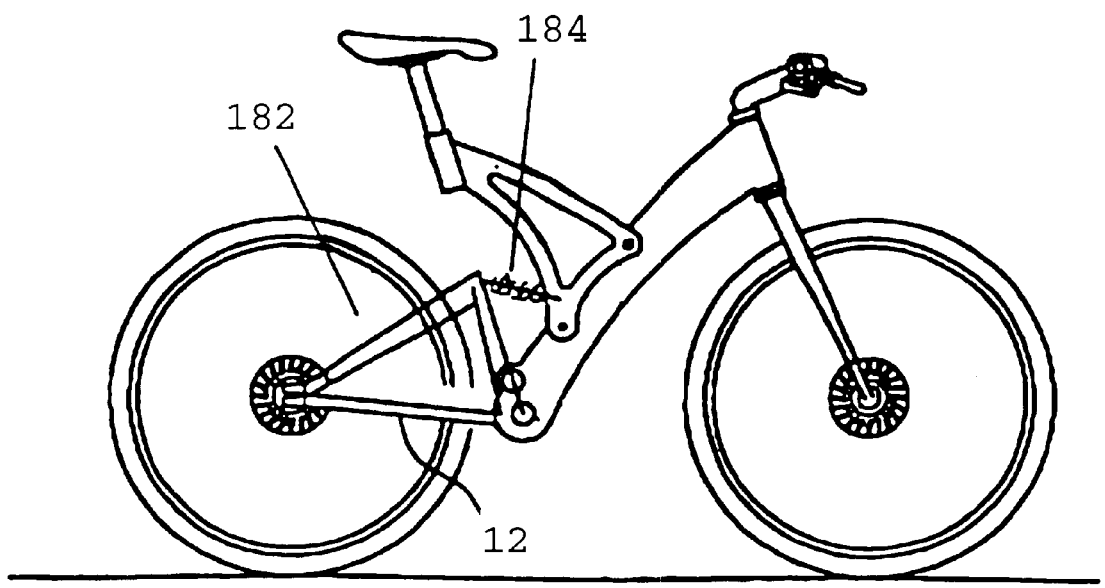
Figure 24:
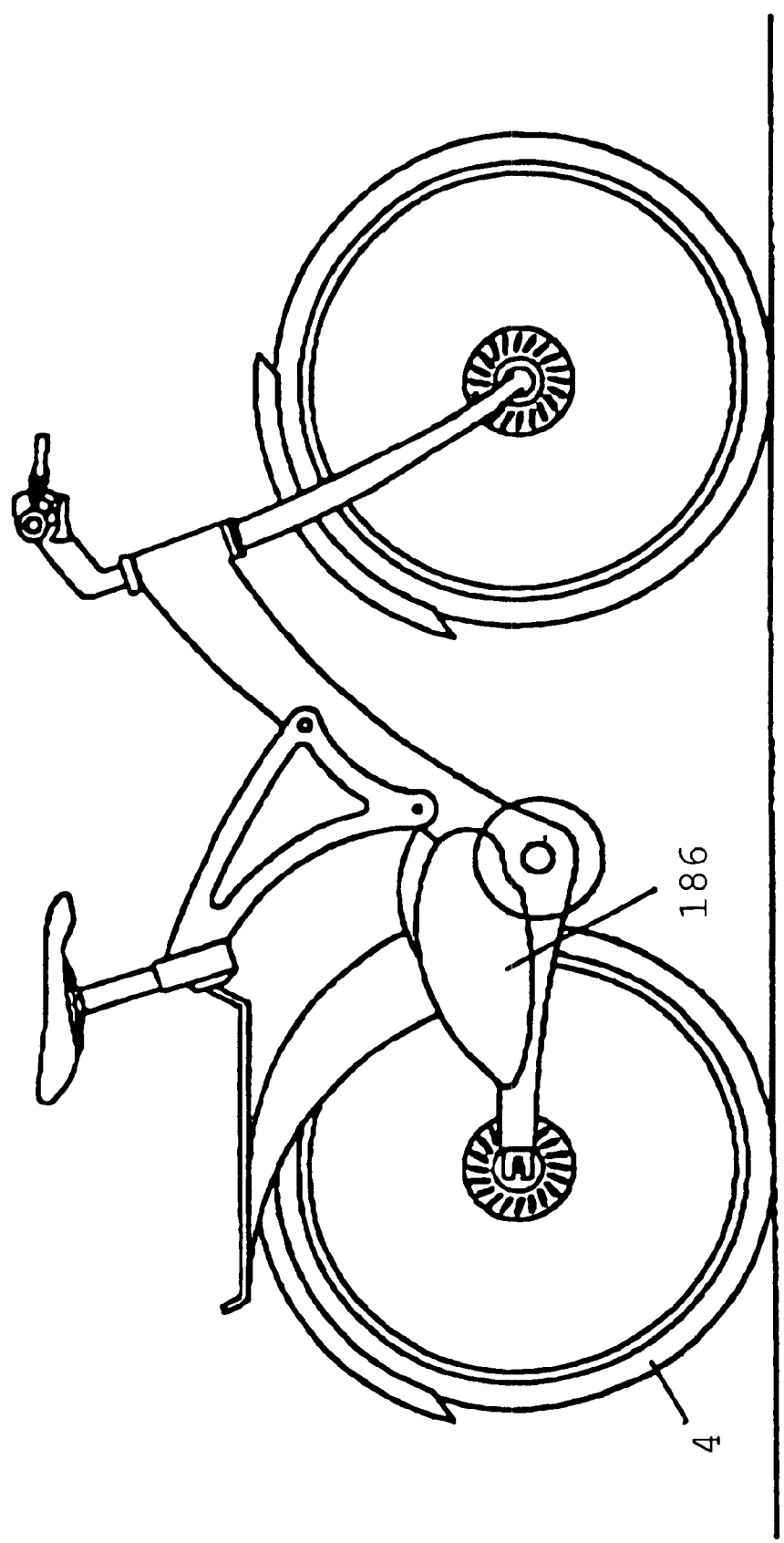
FIG. 24 shows a bicycle equipped with the frame of FIG. 17 and including a servomotor or motorbike.

As can be seen from FIGS. 22 to 24, the inventive frame is not limited to the embodiments represented in FIGS. 1 to 21, but may be modified in various ways. Thus, for example, the plane of separation between the two frame parts 26 and 28 does not extend horizontally in the embodiment of FIG. 22, but substantially vertically. FIG. 23 shows a modified example wherein the rear wheel reception 12 is springily mounted on the rear or lower frame part 26 through the intermediary of corresponding rods 182 and a spring 184. FIG. 24 shows an embodiment of a so-called motorbike wherein, in addition or as an alternative to driving via pedals, the rear wheel 4 may be driven through an electromotor or an internal combustion engine 186.

In all of these modifications or variants the front frame part 28 remains unmodified; merely the rear frame part 26 is modified or altered correspondingly, this being particularly advantageous under economic aspects.

Owing to the pivotal mounting of the seat post 176 on the front frame part 28, the stowing volume of this front frame part is further reduced in a particularly advantageous manner.

Due to the fact that the tensioning lever 34 acting as a depressor is located on the seat post 176, this tensioning lever 34 may be moved to open and close by applying comparatively low forces due to the leverage via the strut 176. At the same time, correspondingly high staying forces may be applied to the tensioning hook upon a closing movement of the tensioning lever 34.

The combination of tensioning lever and seat post may, of course, also be applied in coupling means having a structure different from the above described one. The applicant reserves the right of directing a separate claim or divisional application to this double function (tensioning/supporting).

There is disclosed a frame for a bicycle, wherein the front surfaces of a frame part are braced against each other through tensioning means, such that a supporting member is supported on an abutment, whereby the frame parts are frictionally and positively connected with each other. Moreover disclosed are coupling means for the connection of two components.

What is claimed is:

1. A disassemblable bicycle frame, including connecting means (24) for releasably joining together two frame parts (26, 28) along a plane of separation (30), comprising an abutment with a supporting member (128) which extends from one frame part (26) through a plane containing the plans of separation (30) as far as a bearing (126) in the other frame part (28), and tensioning means (34) for bracing said two frame parts (26, 28), so that said supporting member (128) is supported against said bearing (126), and said two frame parts (26, 28) contact each other by their front faces, characterised in that the plane of separation (30) extends through a down tube (8) in said bicycle frame while having an inclination of about 45° relative to the center axis of said down tube;

said supporting member is a hook (128) fastened in one down tube portion, and said abutment is a bolt (126) arranged in said other down tube portion, a section of which is encompassed by said hook (128); and in that said encompassing portion (130) of said hook (128) transfers a force component acting in the direction of the vertical axis of the bicycle to said bolt (126).

2. The bicycle frame in accordance with claim 1, characterized in that said encompassing portion (130) encompasses said bolt (126) through 180° at maximum.

3. The bicycle frame in accordance with claim 1, characterised in that a front surface (120) of a frame part (26) is provided with a recess (174) in the range of said abutment (126, 128) as far as the adjacent circumferential portion.

4. The bicycle frame in accordance with claim 1, characterised in that said tensioning means include a tensioning hook (46) pivotally mounted on a frame part (28), the hook portion (48) of which may be taken into engagement with a tensioning bolt (112) fastened on said other frame part (26).

5. The bicycle frame in accordance with claim 4, characterised in that said tensioning hook (46) is mounted on an eccentric shaft (56), so that a tensioning force may be applied to said tensioning bolt (112) by turning said eccentric shaft (56).

6. The bicycle frame in accordance with claim 5, characterised by a tensioning lever (34) for actuation of said eccentric shaft (56), which is fastened on the two end portions (78, 80) of said eccentric shaft (56) with the aid of two mounting sections (66, 68).

7. The bicycle frame in accordance with claim 6, characterised in that said tensioning lever (34) may be pivoted towards said other frame part (26) for locking so that one contact portion thereof enters into a recess (36) of said other frame part (28).

8. The bicycle frame in accordance with claim 1, characterised in that said frame (1) is manufactured of high-strength plastic, and said tensioning device is mounted in housing parts (40, 42) of metal each forming one front face of said frame parts (26, 28).

9. The bicycle frame in accordance with claim 1, characterised in that actuating means (22) for the brake and the gear-shift mechanism are guided within said frame (1), said connecting means comprising one coupler (32) for each actuating means (22).

10. The bicycle frame in accordance with claim 9, characterised in that said actuating means are Bowden wires (22), and said couplers each comprise two coupling members (144, 152) having meshing claws (154, 156) which may be taken into operational engagement, or disengaged, by a relative movement of said frame parts (26, 28).

11. The bicycle frame in accordance with claim 10, characterised in that one of said coupling members (15) is guided inside a guide bore in the longitudinal direction of said frame part (26) and biased towards said other coupling member (144) by means of a spring (168).

12. The bicycle frame in accordance with claim 10, characterised in that said coupling members (144, 152) include an engagement projection (154) and an engagement groove (156) which may be made to operationally engage a corresponding one of an engagement groove (156) and an engagement projection (154) of said other coupling member (144, 152).

13. The bicycle frame in accordance with claim 10, characterised in that said coupling members (144, 152) may be uncoupled by a relative rotation of said frame parts (26, 28) about said abutment (126, 128).

14. The bicycle frame in accordance with claim 6, characterised in that said tensioning means, in the assembled condition of said two frame parts (26, 28), receive a force from a depressor indirectly or directly communicating with a seat post (176) of said bicycle frame.

15. The bicycle frame in accordance with claim 14, characterised in that said tensioning lever (36) constitutes said depressor indirectly or directly communicating with said seat post (176) of said bicycle frame.

16. The bicycle frame in accordance with claim 15, characterised in that said tensioning lever (36) may be pivoted, together with said seat post (176), towards said other frame part for locking, so as to enter into a recess of said other frame part with a contact portion thereof.

* * * * *

UNITED STATES PATENT AND TRADEMARK OFFICE
CERTIFICATE OF CORRECTION

PATENT NO. : 6,364,334 B1
DATED : April 2, 2002
INVENTOR(S) : Vladislav Kuba

It is certified that error appears in the above-identified patent and that said Letters Patent is hereby corrected as shown below:

<u>Column 13,</u>
Line 6, change the word "plans" to -- plane --.

Signed and Sealed this

Eighteenth Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,364,334 B1
DATED : April 2, 2002
INVENTOR(S) : Vladislav Kuba

It is certified that error appears in the above-identified patent and that said Letters Patent is hereby corrected as shown below:

Column 13,
Line 7, change the word "plans" to -- plane --.

This certificate supersedes Certificate of Correction issued June 18, 2002.

Signed and Sealed this

Twentieth Day of August, 2002

*Attest:*

*Attesting Officer*

JAMES E. ROGAN
*Director of the United States Patent and Trademark Office*